(12) United States Patent
Froggatt et al.

(10) Patent No.: US 12,235,138 B2
(45) Date of Patent: Feb. 25, 2025

(54) OPTICAL FIBER WITH MICROGRATINGS FOR INCREASED MEASURABLE STRAIN RANGE

(71) Applicant: Intuitive Surgical Operations, Inc., Sunnyvale, CA (US)

(72) Inventors: Mark E. Froggatt, Blacksburg, VA (US); Dawn K. Gifford, Blacksburg, VA (US); Alexander K. Sang, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 0 days.

(21) Appl. No.: 18/348,238

(22) Filed: Jul. 6, 2023

(65) Prior Publication Data
US 2023/0349733 A1    Nov. 2, 2023

Related U.S. Application Data

(63) Continuation of application No. 16/652,938, filed as application No. PCT/US2018/052161 on Sep. 21, 2018, now Pat. No. 11,761,797.
(Continued)

(51) Int. Cl.
*G01D 5/353* (2006.01)
*G02B 6/02* (2006.01)

(52) U.S. Cl.
CPC ..... *G01D 5/35316* (2013.01); *G02B 6/02042* (2013.01); *G02B 6/02076* (2013.01); *G02B 6/02128* (2013.01); *G02B 6/022* (2013.01)

(58) Field of Classification Search
CPC .. G01D 5/35316; G01D 5/3538; G01D 5/268; G01D 5/35354; G02B 6/02042;
(Continued)

(56) References Cited

U.S. PATENT DOCUMENTS

| | | | |
|---|---|---|---|
| 5,798,521 | A | 8/1998 | Froggatt |
| 6,816,638 | B1 | 11/2004 | Bennion et al. |

(Continued)

FOREIGN PATENT DOCUMENTS

| | | |
|---|---|---|
| CN | 102879022 A | 1/2013 |
| CN | 103940363 A | 7/2014 |

(Continued)

OTHER PUBLICATIONS

"U.S. Appl. No. 16/652,938, Examiner Interview Summary mailed Jan. 26, 2023", 2 pgs.
(Continued)

*Primary Examiner* — Jennifer D Bennett
*Assistant Examiner* — Erin R Garber
(74) *Attorney, Agent, or Firm* — Schwegman, Lundberg & Woessner, P.A.

(57) ABSTRACT

An optical fiber with one or more microgratings is disclosed. Methods and apparatus are described for making an optical fiber with one or more microgratings. Methods and apparatus are described for an optical fiber with one or more microgratings. Optical sensing methods and an optical sensing system effectively decouple strain range from the laser tuning range, permit the use of a smaller tuning range without sacrificing strain range, and compensate for ambiguity in phase measurements normally associated with smaller tuning ranges.

20 Claims, 16 Drawing Sheets

Related U.S. Application Data

(60) Provisional application No. 62/646,398, filed on Mar. 22, 2018, provisional application No. 62/566,673, filed on Oct. 2, 2017.

(58) Field of Classification Search
CPC . G02B 6/02076; G02B 6/02128; G02B 6/022
See application file for complete search history.

(56) References Cited

U.S. PATENT DOCUMENTS

| | | | |
|---|---|---|---|
| 8,989,528 B2 | 3/2015 | Udd | |
| 2001/0036204 A1 | 11/2001 | Hatta et al. | |
| 2002/0028034 A1 | 3/2002 | Chen | |
| 2002/0176647 A1 | 11/2002 | Spirin | |
| 2005/0232541 A1 | 10/2005 | Mihailov | |
| 2007/0230861 A1 | 10/2007 | Khrushchev et al. | |
| 2009/0046276 A1 | 2/2009 | Moore | |
| 2009/0123111 A1* | 5/2009 | Udd | G01D 5/35303 385/13 |
| 2011/0109898 A1* | 5/2011 | Froggatt | G01B 11/168 356/73.1 |
| 2015/0124266 A1* | 5/2015 | Davis | A61B 5/1079 356/601 |
| 2016/0245643 A1 | 8/2016 | Mori | |
| 2016/0356709 A1 | 12/2016 | Kremp et al. | |
| 2017/0153387 A1 | 6/2017 | Wei et al. | |
| 2017/0227410 A1* | 8/2017 | Abedin | G01L 1/242 |
| 2017/0334574 A1 | 11/2017 | Wilson et al. | |
| 2018/0128600 A1 | 5/2018 | 'T Hooft | |
| 2018/0231712 A1* | 8/2018 | Paré | G01J 3/36 |
| 2020/0264018 A1 | 8/2020 | Froggatt et al. | |

FOREIGN PATENT DOCUMENTS

| | | |
|---|---|---|
| CN | 205619942 U | 10/2016 |
| CN | 110476095 A | 11/2019 |
| CN | 117270098 | 12/2023 |
| EP | 3692402 A1 | 8/2020 |
| WO | WO-2019070423 A1 | 4/2019 |

OTHER PUBLICATIONS

"U.S. Appl. No. 16/652,938, Examiner Interview Summary mailed Mar. 31, 2023", 2 pgs.
"U.S. Appl. No. 16/652,938, Non Final Office Action mailed Oct. 21, 2022", 22 pgs.
"U.S. Appl. No. 16/652,938, Notice of Allowance mailed Apr. 10, 2023", 11 pgs.
"U.S. Appl. No. 16/652,938, Response filed Jan. 23, 2023 to Non Final Office Action mailed Oct. 21, 2022", 12 pgs.
"U.S. Appl. No. 16/652,938, Response filed Sep. 20, 2022 to Restriction Requirement mailed Aug. 8, 2022", 7 pgs.
"U.S. Appl. No. 16/652,938, Restriction Requirement mailed Aug. 8, 2022", 6 pgs.
"U.S. Appl. No. 16/652,938, Supplemental Notice of Allowability mailed Apr. 26, 2023", 3 pgs.
"Chinese Application Serial No. 201880021966.X, Notification to Make Divisional Application mailed Feb. 7, 2022", w/o English translation, 2 pgs.
"Chinese Application Serial No. 201880021966.X, Office Action mailed Apr. 12, 2023", w/o English Translation, 4 pgs.
"Chinese Application Serial No. 201880021966.X, Office Action mailed Aug. 10, 2022", w/o English Translation, 10 pgs.
"European Application Serial No. 18864695.4, Communication Pursuant to Article 94(3) EPC mailed Nov. 3, 2021", 4 pgs.
"European Application Serial No. 18864695.4, Extended European Search Report mailed Nov. 25, 2020", 10 pgs.
"European Application Serial No. 18864695.4, Partial Supplementary European Search Report mailed Aug. 21, 2020", 10 pgs.
"International Application Serial No. PCT/US2018/052161, International Search Report mailed Jan. 11, 2019", 4 pgs.
"International Application Serial No. PCT/US2018/052161, Written Opinion mailed Jan. 11, 2019", 9 pgs.
Vertut, Jean, et al., "Robot Technology: Teleoperation and Robotics Evolution and Development", English translation, Prentice-Hall, Inc., Inglewood Cliffs, NJ, USA vol. 3A, (1986), 332 pgs.
U.S. Appl. No. 62/566,673, filed Oct. 2, 2017, an Optical Fiber with Microgratings and Methods and Apparatus for Making and Using Same.
U.S. Appl. No. 62/646,398, filed Mar. 22, 2018, an Optical Fiber with Microgratings and Methods and Apparatus for Making and Using Same.
U.S. Appl. No. 16/652,938, filed Apr. 1, 2020, an Optical Fiber with Microgratings for Increased Measurable Strain Range.

\* cited by examiner

OPTICAL FIBER WITH MICROGRATINGS FOR INCREASED MEASURABLE STRAIN RANGE

RELATED APPLICATIONS

This patent application is a continuation of U.S. patent application Ser. No. 16/652,938, filed Apr. 1, 2020, entitled "AN OPTICAL FIBER WITH MICROGRATINGS FOR INCREASED MEASURABLE STRAIN RANGE," which is a U.S. National Stage Filing under 35 U.S.C. 371 from International Application No. PCT/US2018/052161, filed on Sep. 21, 2018, and published as WO 2019/070423 A1 on Apr. 11, 2019, which claims the priority and benefit of U.S. Provisional Patent Application 62/566,673, filed Oct. 2, 2017 entitled "AN OPTICAL FIBER WITH MICROGRATINGS AND METHODS AND APPARATUS FOR MAKING AND USING SAME" and U.S. Provisional Patent Application 62/646,398, filed Mar. 22, 2018 entitled "AN OPTICAL FIBER WITH MICROGRATINGS AND METHODS AND APPARATUS FOR MAKING AND USING SAME," each of which are incorporated herein by reference in their entirety.

TECHNICAL FIELD

The technology described in this application relates to optical fibers with gratings, making optical fibers with gratings, and interferometric measurements using an optical fiber sensor with gratings.

BACKGROUND

Optical fiber-based strain sensing technology is useful for measuring physical deformation of an optical fiber (containing one or more waveguides) caused by, for example, changes in shape, tension or compression, or temperature of the optical fiber. A multi-core optical fiber includes several waveguides embedded within a single optical fiber. A continuous measure of strain along the length of a core can be derived by interpreting the optical response of the core using swept wavelength interferometry, e.g., Optical Frequency Domain Reflectometry (OFDR). With knowledge of the relative positions of the cores along the length of the optical fiber, these independent strain signals may be combined to gain a measure of the strain profile applied to the multi-core optical fiber. The strain profile of the optical fiber refers to the measure of applied bend strain, twist strain, and/or axial strain along the length of the optical fiber at a sufficiently high (e.g., less than 50 micrometers) sample resolution. Previous patents have described shape sensing with multi-core optical fibers, e.g., see U.S. Pat. Nos. 7,781,724 and 8,773,650, both of which are incorporated herein by reference.

SUMMARY

Example embodiments include an optical sensor for use with a tunable laser that generates light over a range of wavelengths corresponding to a tuning range of the tunable laser. The optical sensor includes an optical fiber including one or more cores. For each core of the one or more cores: the core is inscribed with a first grating at a first grating location along a length of the core and a second grating located at a second grating location along the length of the core; a width of a spectrum of a reflection from at least one of the first grating and the second grating is larger than a tuning range of the tunable laser, wherein the width of the spectrum of the reflection enables measurement of reflections for a predetermined range of strains to be measured by the optical sensor, the predetermined range of strains including a maximum strain that creates a wavelength shift greater than half of the tuning range of the tunable laser, and a portion of the spectrum of the reflection is within the tuning range of the tunable laser for the predetermined range of strains.

In an example implementation, the first grating and the second grating each includes at least two refractive index perturbations spaced apart along the length of the core.

In an example implementation, the one or more cores comprise a plurality of cores.

In an example implementation, for each core of the one or more cores, the first grating is adjacent to the second grating and is spaced apart from the second grating by a distance along the length of the core in a range of 50 µm to 500 µm or 0.5 mm.

In an example implementation, for each core of the one or more cores, the first grating is adjacent to the second grating and spaced apart by a distance along the length of the core 0.2 mm or more.

In an example implementation, for each core of the one or more cores, a length of the first grating and a length of the second grating are each in a range of 10 µm to 100 µm. In another example implementation, for a core of the one or more cores, a length of the first grating along the length of the core is in a range of 10 µm to 50 µm.

In an example implementation, for each core of the one or more cores, the first grating is adjacent to the second grating and spaced apart from the second grating by a distance along the length of the core that constrains measurement of reflections up to a predetermined maximum change in a rate of strain.

In an example implementation, for each core of the one or more cores, the first grating is adjacent to the second grating and spaced apart from the second grating by a distance along the length of the core to permit detection of a wavelength shift due to strain on the core that is larger than one half of the tuning range of the tunable laser.

In an example implementation, for a core of the one or more cores, a distance between adjacent refractive index perturbations within the first grating is in a range of 100 nm to 2000 nm.

In an example implementation, a length of the first grating or the second grating is shorter than a resolution of a measurement system for use with the optical sensor.

In an example implementation, a length of the first grating and a length of the second grating are the same.

In an example implementation, a length of the first grating is shorter than a length of the second grating.

In an example implementation, the first grating is 10 µm long and is spaced apart from the second grating by a distance along the length of the core of 130 µm.

Example embodiments include a method for making an optical fiber sensor. The method includes the following steps:
  generating an ultraviolet light beam;
  splitting the ultraviolet light beam into a first ultraviolet light beam and a second ultraviolet light beam;
  focusing the first ultraviolet light beam so the first ultraviolet light beam is narrower in width than the second ultraviolet light beam;

combining the first ultraviolet light beam and the second ultraviolet light beam to form an interference pattern that extends across one or more cores in the optical fiber sensor; and exposing the optical fiber sensor to the interference pattern to inscribe a first grating in each core of the one or more cores.

In an example implementation, the splitting step may include using a phase mask to split the ultraviolet light beam, and the focusing step may include using a vertical cylindrical lens to focus the first ultraviolet light beam.

In an example implementation, two tiltable mirrors are used to tune a center frequency of a reflection associated with the grating.

In an example implementation, the method includes translating a core of the one or more cores relative to exposure of the interference pattern.

In an example implementation, for each core of the one or more cores, the first grating includes at least two refractive index perturbations spaced apart along a length of the core by a spacing distance that is based on a tuning range of a tunable laser.

In an example implementation, the method includes exposing a second portion of the optical fiber sensor to the interference pattern to inscribe a second grating in each core of the one or more cores, wherein, for each core of the one or more cores, the second grating is spaced apart from the first grating by a distance along a length of the core in a range of 100 µm to 500 µm, or in another example implementation, in a range of 50 µm to 0.5 mm.

In an example implementation, for each core of the one or more cores, a length of the first grating is in a range of 10 µm to 100 µm.

In an example implementation, for a core of the one or more cores, a distance between adjacent refractive index perturbations within the first grating is in a range of 100 nm to 2000 nm.

In an example implementation, the method further comprises exposing a second portion of the optical fiber sensor to the interference pattern to inscribe a second grating in each core of the one or more cores. For each core of the one or more cores, the second grating is spaced apart from the first grating by a distance along the length of the core that constrains measurement of reflections up to a predetermined maximum change in a rate of strain.

Example embodiments include an optical sensing system that comprises a tunable laser that generates light over a range of wavelengths corresponding to a tuning range of the tunable laser, and an optical fiber including one or more cores. For each core of the one or more cores:

the core is inscribed with a first grating at a first grating location along a length of the core and a second grating located at a second grating location along the length of the core;

a width of a spectrum of a reflection from at least one of the first grating and the second grating is larger than a tuning range of the tunable laser, the width of the spectrum of the reflection enables measurement of reflections for a predetermined range of strains to be measured by the optical sensing system, the predetermined range of strains including a maximum strain that creates a wavelength shift greater than half of the tuning range of the tunable laser, and a portion of the spectrum of the reflection is within the tuning range of the tunable laser for the predetermined range of strains; and circuitry, coupled to the optical fiber, configured to:
detect measured reflection data from the optical fiber over the tuning range of the tunable laser, and
determine a strain on the optical fiber based on a change in the measured reflection data.

In an example implementation, the tuning range of the laser is decoupled from a range of strains detectable by the optical sensing system.

In an example implementation, the tuning range of the laser is in a range of 5 nm-20 nm.

In an example implementation, the circuitry includes OFDR circuitry that has a spatial measurement resolution in the range of 10 µm to 200 µm.

In an example implementation, the optical sensing system determines a shape or a three dimensional position of at least a portion of the fiber.

In an example implementation, measurements by the optical sensing system are constrained by a maximum rate of change of strain such that the predetermined range of strains is decoupled from the tuning range of the tunable laser.

In an example implementation, the width of the spectrum of the reflection from the at least one of the first grating and the second grating is larger than the tuning range of the tunable laser.

In an example implementation, the circuitry is configured to resolve phase ambiguity when processing measured reflection data using a phase unwrapping that minimizes a derivative of a phase at multiple points along the core.

In an example implementation, for each core of the one or more cores, the first grating is adjacent to the second grating and is spaced apart by a distance along the length of the core in a range of 50 µm to 0.5 mm.

In an example implementation, for each core of the one or more cores, the first grating is adjacent to the second grating and spaced apart by a distance along the length of the core 0.2 mm or more.

In an example implementation, for each core of the one or more cores, a length of the first grating and a length of the second grating are each in a range of 10 µm to 50 µm.

In an example implementation, for a core of the one or more cores, a length of the first grating along the length of the core is in a range of 10 µm to 100 µm.

In an example implementation, for a core of the one or more cores, a distance between adjacent refractive index perturbations within the first grating is in a range of 100 nm to 2000 nm.

In an example implementation, for each core of the one or more cores, the first grating is adjacent to the second grating and spaced apart from the second grating by a distance along the length of the core to permit detection of a wavelength shift due to strain on the core that is larger than one half of the tuning range of the tunable laser.

In an example implementation, for each core of the one or more cores, the first grating is adjacent to the second grating and spaced apart by a distance along the length of the core that constrains measurement of reflections up to a predetermined maximum change in a rate of strain.

In an example implementation, a grating length is shorter than a resolution of a measurement system for use with the optical sensor.

In an example implementation, a length of the first grating and a length of the second grating are the same.

In an example implementation, a length of the first grating is shorter than a length of the second grating.

Further example embodiments include optical fibers, systems, and methods as described herein.

BRIEF DESCRIPTION OF THE FIGURES

FIG. 10 is a graph that illustrates an index modulation for example microgratings in an example optical fiber sensor;

DESCRIPTION OF EXAMPLE EMBODIMENTS

Figure 1:
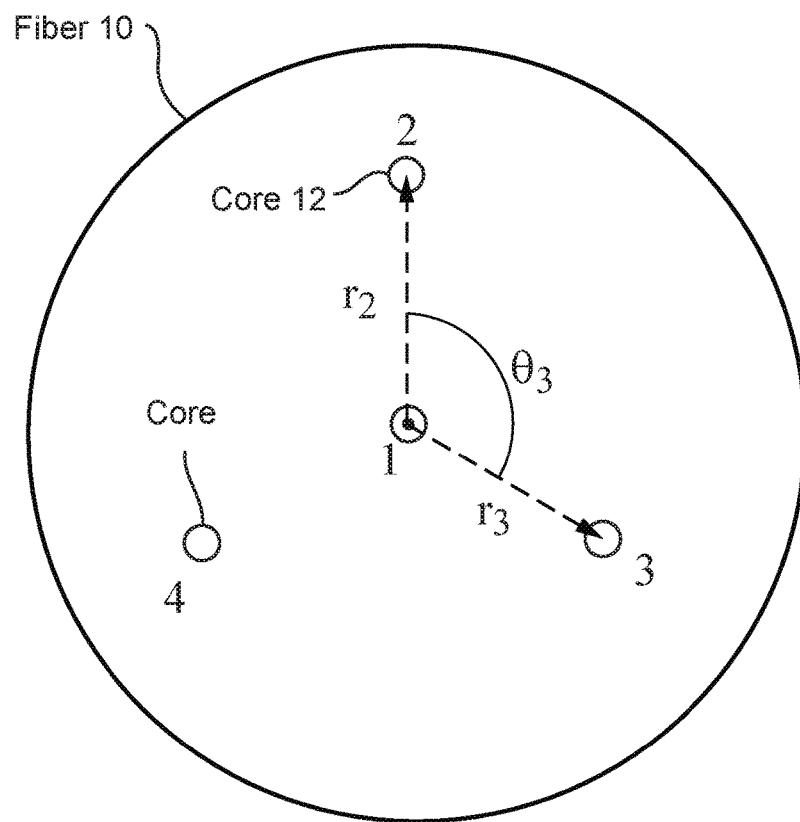
FIG. 1 shows a cross-section of an example optical fiber design.

The following description sets forth specific details, such as particular embodiments for purposes of explanation and not limitation. But it will be appreciated by one skilled in the art that other embodiments may be employed apart from these specific details. In some instances, detailed descriptions of well-known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Software program instructions and data may be stored on a non-transitory, computer-readable storage medium, and when the instructions are executed by a computer or other suitable processor control, the computer or processor performs the functions associated with those instructions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer-readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus, machine-implemented.

In terms of hardware implementation, the functional blocks may include or encompass, without limitation, a digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Unless the context indicates otherwise, the terms "circuitry" and "circuit" are used herein to refer to structures in which one or more electronic components have sufficient electrical connections to operate together or in a related manner. Circuitry can include one circuit or more than one circuit. Circuitry that includes a processor may sometimes include hardware and software components. Software refers to stored or transmitted information (e.g., instructions and data) that controls operation of the processor or that is accessed by the processor while operating, and hardware refers to components that store, transmit, and operate on the data. The distinction between software and hardware is not always clear-cut, however, because some components share characteristics of both. A given processor-implemented software component can often be replaced by an equivalent hardware component without significantly changing operation of circuitry, and a given hardware component can similarly be replaced by equivalent processor operations controlled by software.

Circuitry can be described structurally based on its configuration or other characteristics. For example, circuitry that is configured to perform control operations is sometimes referred to as control circuitry and circuitry that is configured to perform processing operations is sometimes referred to as processing circuitry.

In general, interfaces, processors, servers, memories, detectors, user interfaces, and other items may be included in a system in which they are operated automatically or partially automatically. The term system and the term apparatus both refer to a combination of two or more parts or components that can perform an operation together. A system and an apparatus may be characterized by configured operation.

Figure 2:
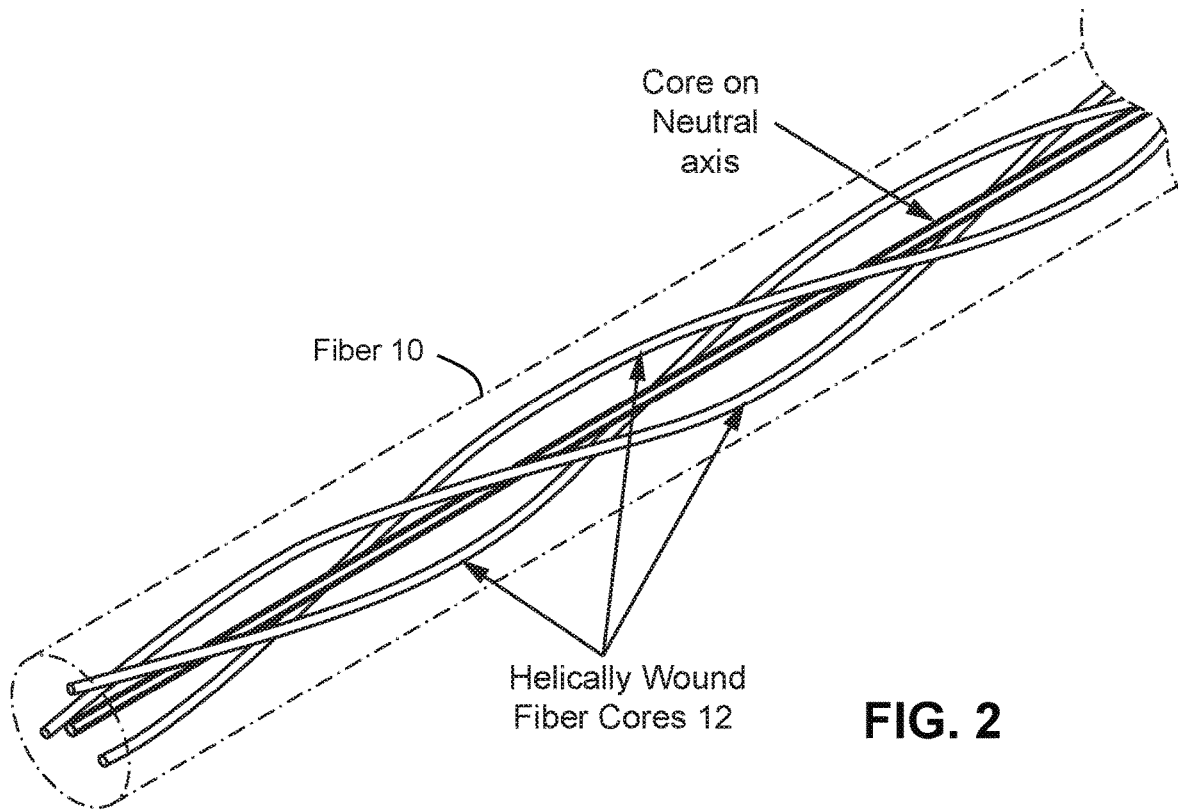
FIG. 2 shows an example diagram of spun or helically-wound multicore fiber.

Although FIGS. 1 and 2 show example embodiments of an optical fiber 10 with multiple cores, the technology described in this application also applies to an optical fiber with a single core. In more detail, FIG. 1 shows an example embodiment of an optical fiber 10 comprising a multicore fiber including four cores with one central core 1 and three evenly-spaced outer cores 2-4. One example application for such a fiber is shape sensing. The multicore fiber is spun in order to be able to measure the twist of a fiber sensor. Spinning the fiber during manufacture creates a fiber in which the outer cores are wound in a helical pattern around the center core. FIG. 2 shows an optical fiber 10 comprising a spun or helically-wound multicore fiber with helically-wound cores 12.

When the fiber 10 is under pure axial tension or compression, all the one or more fiber cores of the fiber 10 experience the same amount of lengthening or shortening. Bend, twist, and tension or compression all cause changes in the strain measured in the various fiber cores. A series of equations, which can be expressed in part in a matrix, can be formed to describe the relationship between the bend, twist, and strain on the fiber sensor and the strain on each core. For example, if four cores are used to measure shape (see, e.g., FIG. 1 or any combination of 4 cores from another configuration), the relationship between the strain in these four cores and the applied bend, twist, and strain as a function of length is:

$$\begin{bmatrix} \varepsilon_1(z) \\ \varepsilon_2(z) \\ \varepsilon_3(z) \\ \varepsilon_4(z) \end{bmatrix} = \begin{bmatrix} \alpha r_1 \sin(\theta_1) & -\alpha r_1 \cos(\theta_1) & \beta r_1^2 & 1 \\ \alpha r_2 \sin(\theta_2) & -\alpha r_2 \cos(\theta_2) & \beta r_2^2 & 1 \\ \alpha r_3 \sin(\theta_3) & -\alpha r_3 \cos(\theta_3) & \beta r_3^2 & 1 \\ \alpha r_4 \sin(\theta_4) & -\alpha r_4 \cos(\theta_4) & \beta r_4^2 & 1 \end{bmatrix} \begin{bmatrix} B_x(z) \\ B_y(z) \\ T(z) \\ E(z) \end{bmatrix} \quad (1)$$

Here $\varepsilon_i(z)$ is the strain measured in core i as a function of distance down the sensor, z, $\alpha$ is a constant relating strain to bend ("bend gain"), $\beta$ is a constant relating strain to twist ("twist gain"), $r_i$ is the radial location of core i with respect to the center of the fiber, $\theta_i$ is the angular location of core i relative to a reference core such as core 2 in FIG. 1, $B_x(z)$ is the bend in the X-Z plane as a function of distance down the sensor, $B_y(z)$ is the bend in the Y-Z plane as a function of distance, $T(z)$ is the twist of the sensor as a function of distance, and $E(z)$ is the axial strain applied to the sensor as a function of distance.

Figure 3:
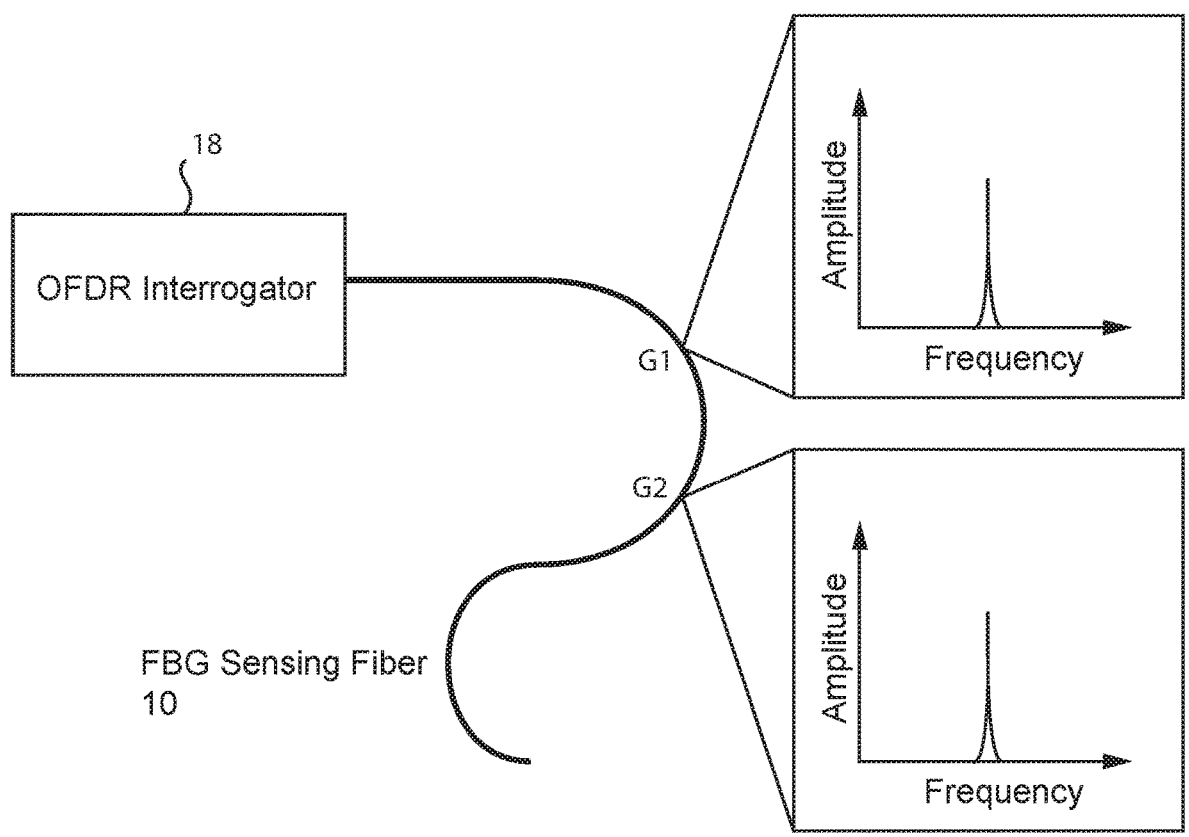
FIG. 3 shows an Optical Frequency Domain Reflectometry (OFDR) interrogator coupled to an optical fiber sensor with Bragg gratings and reflections detected from two of the Bragg gratings.

A measurement of the amplitude and phase of the light reflected along the length of the fiber sensor with high resolution and high sensitivity may be achieved using Optical Frequency Domain Reflectometry (OFDR). FIG. 3 shows an OFDR interrogator 18 coupled to an optical fiber sensor with Bragg gratings and reflections detected from two of the Bragg gratings G1 and G2. The term grating includes any refraction pattern purposefully inscribed on a fiber core. The reflection from one fiber Bragg grating (FBG) G1 written at a first position along the optical fiber is detected by the OFDR interrogator as a well-defined peak, and the reflection from another Bragg grating G2 written at a second position farther along the optical fiber is also detected by the OFDR interrogator as a well-defined peak. The grating period determines the frequency at which the grating's peak is detected.

Figure 4A:
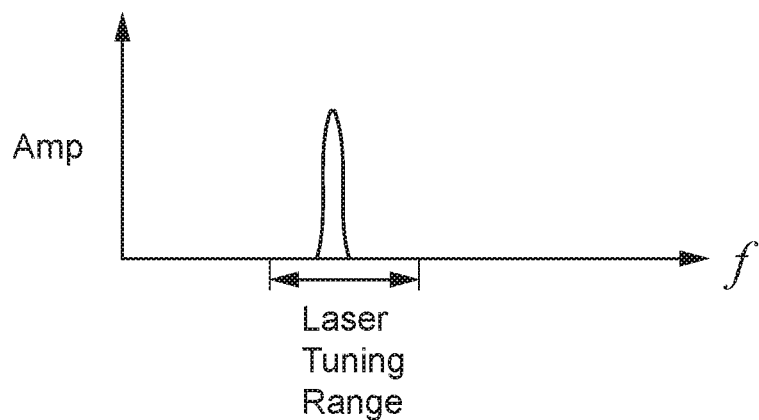
FIG. 4A illustrates a detected grating reflection inside a laser scan frequency range in a no-strain or low-strain condition.

Strain sensing in an optical fiber relies upon the measurement of small changes in the length of the fiber. In one example, individual reflectors in a single Bragg grating (i.e., individual refractive index perturbations) are spaced with a period $\Lambda_G$ of about 500 nanometers apart which produce reflections in the C-band which has a wavelength range of about 1530 to 1565 um or a frequency range of about 191,560 GHz to 195,943 GHz. An example range of period spacing $\Lambda_G$ of about 100 to 500 nanometers apart provides unambiguous OFDR measurements because two reflections from adjacent reflectors in the grating are within a single wavelength of one another. In example implementations, these adjacent reflectors each comprise a perturbation in the index of refraction along the fiber. Typically, gratings are written into an optical fiber that reflect a very narrow frequency band of wavelengths (e.g., 0.1 nm) when compared to an interrogating laser's tuning or sweep range. FIG. 4A illustrates a detected grating reflection inside a laser scan frequency range when the grating is in a no-strain (i.e., zero strain) or low-strain condition.

Figure 4B:
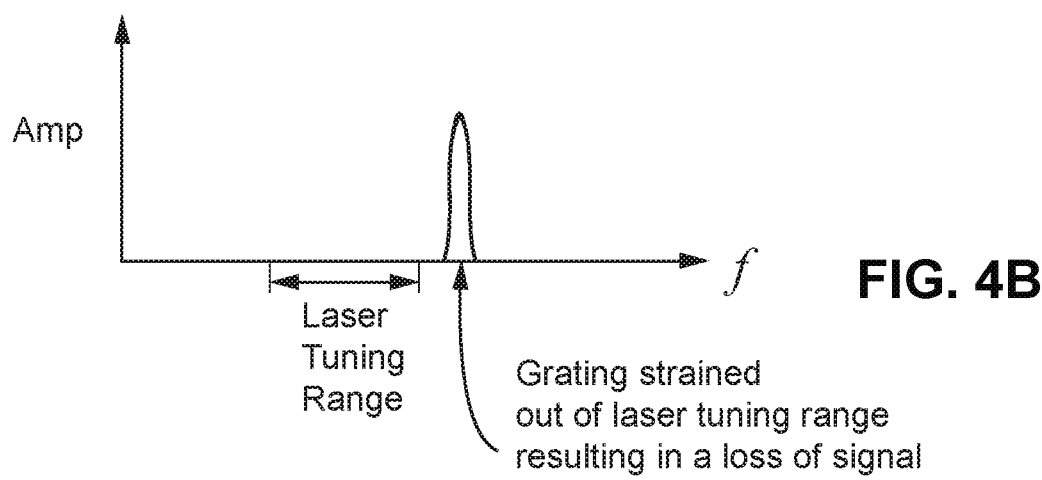
FIG. 4B illustrates a grating reflection outside the laser scan frequency range in a high-strain condition.

But if a fiber grating is strained to the point where its reflection frequency is outside of the tuning or sweep range of an interrogating laser, then the grating reflection is not detected by the OFDR apparatus. FIG. 4B illustrates a grating reflection outside the laser tuning frequency range in a high-strain condition.

In order to include the grating reflection in the tuning range of the laser, the tuning range of the laser is set to include grating reflections produced under the largest expected strain(s) (e.g., for the fiber under tension, and for the fiber under compression). In this approach, the strain range expected in the fiber determines the tuning range of the laser. The strain range is defined at one end of the range by the largest expected compression (negative or compressive strain) to be detected by the optical fiber and at the other end by the largest expected tension (positive or tensile strain) to be detected by the optical fiber. A larger strain range is enabled by a larger tuning range for the laser.

Figure 4C:
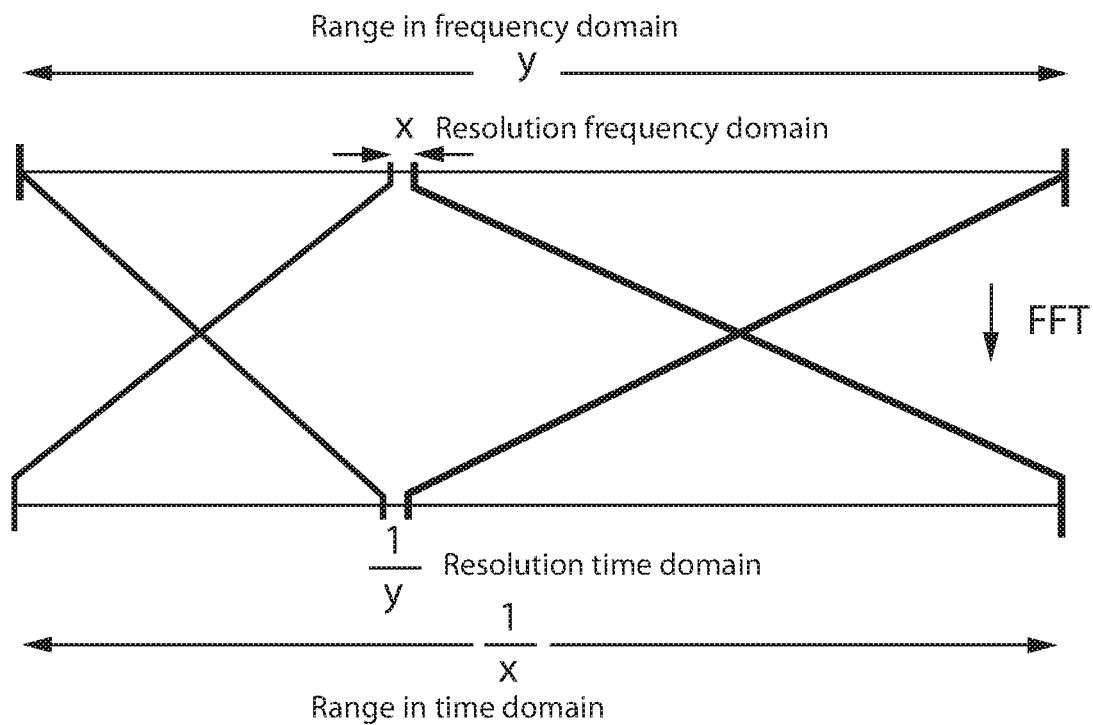
FIG. 4C illustrates how tuning range and resolution in the frequency domain have corresponding but inversely proportional operations in the time domain.

An important feature of an OFDR system is its spatial resolution, where spatial resolution generally refers to how much detail can be resolved per unit of distance. To appreciate spatial resolution in an OFDR system, it is important to understand some basic properties of the Fourier transform which is used in OFDR operations. The Fourier transform decomposes a signal in the time domain into the frequency domain into the frequencies that make up the signal). Linear operations performed in one domain (time or frequency) have corresponding operations in the other domain which are sometimes easier to perform. This correspondence is an inverse one as is shown in FIG. 4C.

The Fourier transform converts frequency domain data into time domain data. FIG. 4C shows that the Fourier transform converts resolution X in frequency into a time domain range 1/X. Similarly, the Fourier transform converts a frequency range Y (laser tuning range in OFDR) into a time sampling resolution 1/Y (temporal resolution in OFDR). Time sampling resolution is related to spatial resolution in the time domain because length along an optical fiber is related to the amount of the time it takes for reflected laser light to traverse that length. The spatial resolution of the OFDR is inversely proportional to a corresponding tuning range in the frequency domain of the laser used in the OFDR system. This inverse relationship between the frequency and time domains means that the larger the tuning range of the laser, Y in the example, the smaller the spatial resolution of an OFDR system, 1/Y in the example. A smaller (finer) spatial resolution generally means more measurement samples per unit length along the fiber are processed, which can be undesirable in many OFDR applications.

OFDR measures reflected power from an optical network as a function of optical frequency (e.g., GHz), and then takes a Discrete Fourier Transform to convert this data from the frequency domain (e.g., GHz) to the time domain (e.g., nanoseconds (ns)). The transformed time domain data has a spatial increment that is the inverse of the total frequency range. As an example, a range of 1000 GHz corresponds, in a time domain or temporal increment or resolution, to 0.001 nanoseconds. To interrogate a meter of optical fiber, the data should be sampled with a resolution of at most 0.1 GHz, meaning that a measurement point is acquired every 100 MHz. This spectral frequency domain resolution yields a time domain range of 10 ns. This is necessary to interrogate one meter of fiber because it takes about a total of 10 nanoseconds for light to travel from the beginning to the end of the fiber and for the reflected light to travel from the end of the fiber back to the beginning. The spacing between these measurement points (the spatial resolution) along the 1 meter length of fiber (equivalent to about 10 ns of time) is determined by the laser scan frequency range. To resolve OFDR measurement data to 100 microns, or about 1 ten thousandth (1/10,000) of a desired 1 meter length range, then ten thousand (10,000) measurement points are taken. With this approach, where the measurement points are spaced 100 MHz apart, a laser scan range of at least 1000 GHz is used.

Continuing with the example of measuring the strain along a 1 meter (e.g., about 10 ns of time) length of optical fiber with a spatial resolution of 100 microns using a laser tuning range of 1000 GHz, if Bragg gratings are written into the fiber to reflect in the center of the laser tuning range at zero strain, then the OFDR system can detect strains that cause reflection shifts of +500 GHz and −500 GHz. If a conventional C-band laser operates with a center frequency of 1540 nm, or 194,670 GHz, the OFDR system can detect strains with a maximum magnitude of:

$$|\varepsilon|_{max} = \frac{\Delta v1}{v_{center}} \frac{1}{\eta} = \frac{500 \text{ GHz}}{194,670 \text{ GHZ}} \frac{1}{0.8} = 3.2 \times 10^{-3}$$

where $\eta$ is the strain-optic coefficient (typically 0.8), $v_{center}$ is the center frequency of the laser scan and the zero strain reflection frequency of the grating, and $\Delta_v$ is the largest change of the laser from the center wavelength during the scan, i.e., half of the scan range. With this approach, to detect strains larger than $3.2 \times 10^{-3}$, the laser scan range increases, which can increase the cost of the laser, increase the number of measurement points, and increase the amount of data processing of those increased number of measurement points.

In order to resolve (detect reflections from) individual gratings in this example, the resolution of the OFDR measurement must be smaller than the spacing between reflections. If this spacing is D, the time difference between grating reflections will be $$\Delta \tau = \frac{2nD}{c},$$

where c is the speed of light and n is the group index of the fiber. The factor of two is because the light travels to and from the reflection in the fiber. Higher spatial or temporal resolution can be provided by having the laser sweep over a larger frequency range.

Figure 4D:
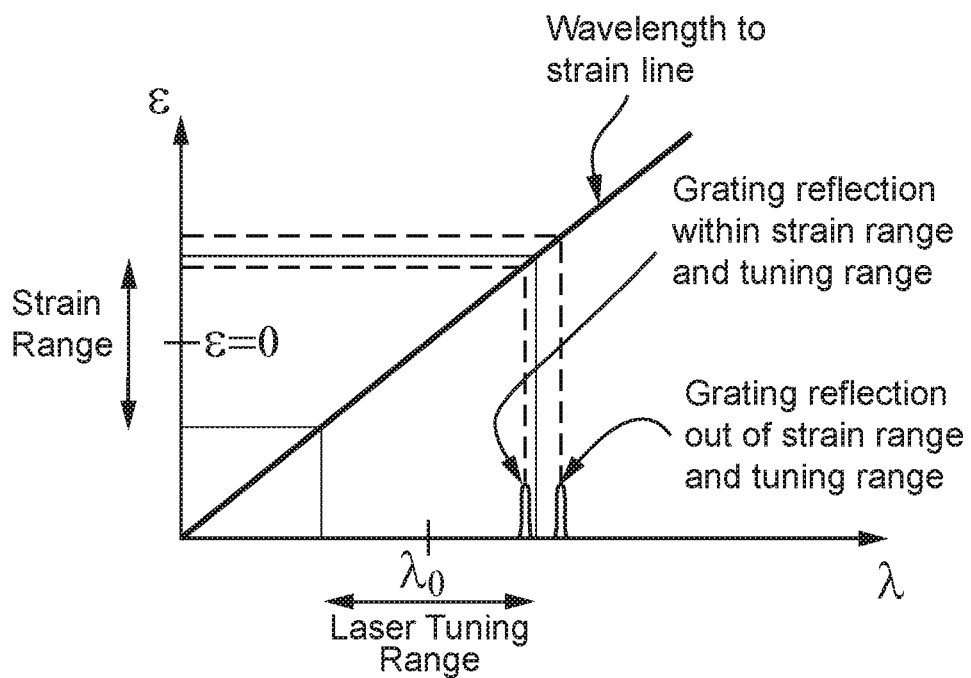
FIG. 4D is a graph illustrating an example strain range of an optical fiber versus an example laser scan range.

The graph in FIG. 4D illustrates an example strain range of an optical fiber versus an example laser tuning range. The center of the strain range corresponds to zero strain, which in turn corresponds to a center wavelength $\lambda_0$ in the laser tuning range. FIG. 4D shows one grating reflection with the fiber under tension just within the laser tuning and strain ranges and another grating reflection with the fiber under tension just outside the laser tuning and strain ranges. The out-of-range grating reflection is not detected by the OFDR system because it is outside of the laser tuning range.

Given that the strain range expected in the fiber sets the laser tuning range and therefore also sets the inversely related spatial resolution of the OFDR system, many OFDR systems are over-specified with respect to the tuning range of the laser, which leads to undesirable outcomes including larger amounts of OFDR data to process because of the finer spatial resolution and longer laser scan times. Another problem is that the design and manufacture of swept lasers becomes increasingly difficult (and as a result the laser is more expensive) as the tuning range increases. These disadvantages make it desirable to (i) improve grating design for an optical fiber sensor, and (ii) decouple strain range from laser tuning range.

Figure 5A:
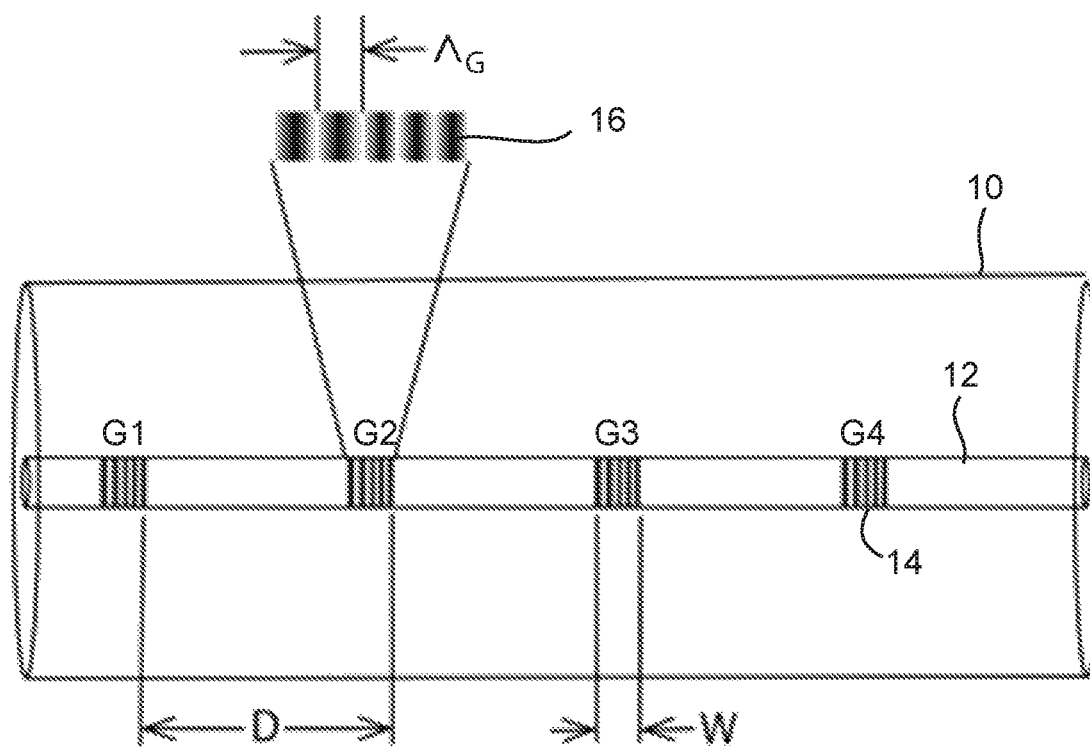
FIG. 5A shows an optical core with four example gratings.

The following describes how strain relates to fiber reflections. The discussion applies to reflections in general, but in example embodiments the reflections are related to gratings. FIG. 5 shows a fiber 10 with a single core 12 with four gratings G1-G4 inscribed or written on the core 12. D is the distance between adjacent gratings. The second grating G2 is expanded to show more clearly the individual reflectors 16 (which in example implementations comprise index of refraction perturbations) within a single grating. The distance between adjacent refractive index perturbations within one grating is $\Lambda_G$. The length of an individual grating along the length of the fiber is identified as W. A variable d (not shown) is the total length change of the strained fiber (i.e., the strained fiber length−minus the unstrained fiber length). The strain κ on the optical fiber core may be expressed as:

$$\varepsilon = \frac{d}{D}$$

Figure 5B:
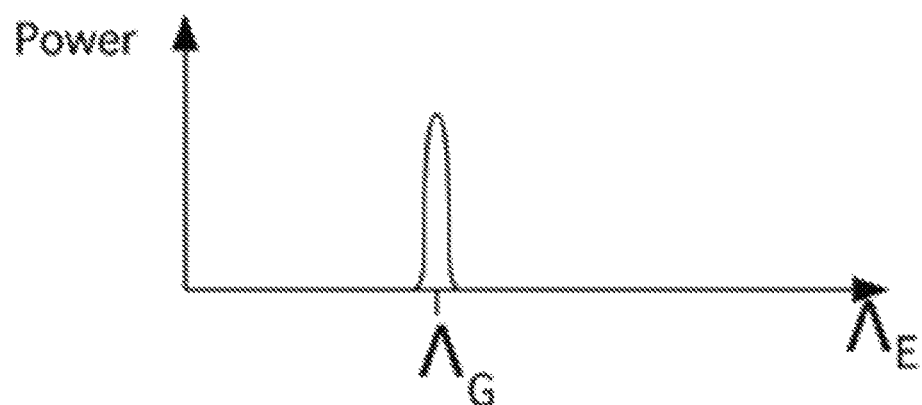
FIG. 5B shows a reflection peak when $\Lambda_E = \Lambda_G$.

For a reflective measurement, the effective wavelength, $\Lambda_E$, of the light in the optical fiber waveguide is:

$$\Lambda_E = \frac{\lambda}{2n},$$

where $\lambda$ is the vacuum wavelength of the light and n is the index of refraction of the fiber core (waveguide). When the effective wavelength of the light in the fiber core, $\Lambda_E$, is equal to the period of the index perturbation in the core, $\Lambda_G$, the reflected light is maximized and produces a peak in the optical spectrum as shown in FIG. 5B.

Technology is now described that determines the strain based on the change in distance between subsequent gratings. This distance can be determined by the relative phase of two adjacent reflections from adjacent gratings.

If only the relative phase of the reflections from the two adjacent reflections (their difference in phase) is measured, then the resulting strain measurement becomes ambiguous (this ambiguity is illustrated in a conceptual way in FIG. 6C and discussed below) when the total length change "d" of the strained fiber is greater than half of the effective wavelength (which corresponds to a larger strain on the fiber):

$$|d| > \frac{\Lambda}{2}$$

That means the maximum expected strain for unambiguous strain measurement is:

$$\varepsilon_{max} = \frac{\lambda}{4nD}$$

There are physical constraints in many optical fiber sensors and/or in applications of optical fiber sensors that do not allow for arbitrarily large strains/strain ranges. Using the maximum expected strain equation above and choosing 10,000 ppm as an example maximum expected strain, an index of refraction of 1.48, and a laser wavelength of 1550 nm at the center of an example laser tuning range, produces the following distance D between two adjacent reflections:

$$10 \times 10^{-3} = \frac{(1550 \text{ nm})}{4(1.48)D}$$

$$D = 26 \text{ microns}$$

In other words, having adjacent reflections spaced 26 microns apart in an optical fiber means that their corresponding coherent reflections may be used to measure strains up to 10,000 ppm without ambiguity.

Higher OFDR spatial resolution can be provided with closer-spaced gratings. A non-limiting example range of higher resolution grating spacing is 10-50 microns. A non-limiting example range of low spatial resolution grating spacing is 0.2 mm or more. More closely-spaced reflectors require a correspondingly larger wavelength scan range. A non-limiting example larger wavelength scan range is 30 nm centered around 1550 nm which corresponds to a frequency range of about 3900 GHz. Larger wavelength scan ranges can require longer laser sweep times. Higher spatial resolution data also produces more OFDR measurement points per unit length of the fiber, thereby increasing the amount of measurement data to be processed by the data processor.

For these reasons, it would be desirable to use a smaller laser scan range, and yet, still generate reliable and accurate phase measurements, despite potential phase ambiguity associated with a smaller laser scan range (as explained below) and corresponding coarser OFDR spatial resolution. An approach that achieves these objectives constrains the rate of change of the strain, spatially or temporally, to a value lower than a maximum rate of strain change.

Lower OFDR spatial resolution and a smaller laser scan range result in phase ambiguity. The phase of detected optical signals reflected at points along the fiber repeat every $2\pi$ radians, but the accumulated distance along the fiber does not repeat. Therefore, the detected phase is "unwrapped" to determine the accumulated distance along the fiber.

Figure 6A:
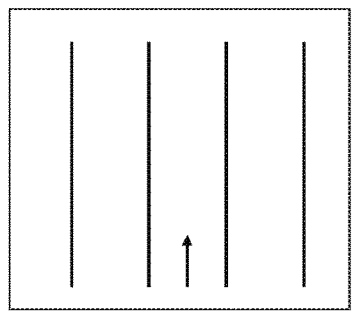
FIGS. 6A-6H are illustrations used to explain phase unwrapping.
Figure 6B:
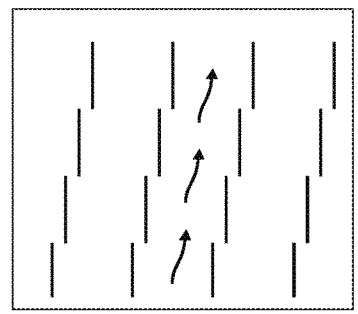
Figure 6C:
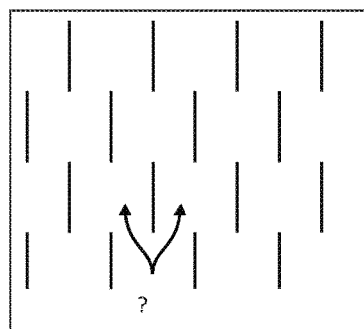
Figure 6D:
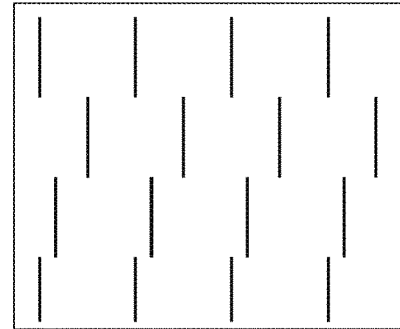

Consider the conceptual illustrations in FIGS. 6A-6H that assist in understanding the phase tracking approach used in this application that selects a phase associated with a smallest change in strain. Consider an assigned "lane" moving down a "track" illustrated with parallel lanes as shown in the conceptual representation in FIG. 6A. If the lanes shift by a small step change, as shown in FIG. 6B, then the lane with the most overlap or the lane with the least shift is selected. For slowly varying track/lane changes, this approach works well. That is the case in FIGS. 6A and 6B where the vertical lines assume that the lanes will always point in the same direction, and that relatively small corrections are made to the position in the lanes. But if the lanes shift farther between observations, then it is more difficult to determine which lane to choose. If the lane shift is exactly ½ of a lane, then the decision is ambiguous, as shown in FIG. 6C. The uncertainty in the location of the lane means that choosing the smallest shift will fail before the shift is exactly half. Applying the lane analogy to phase tracking, this half lane shift is analogous to a $\pi$ radian or 180 degree phase change.

Figure 6E:
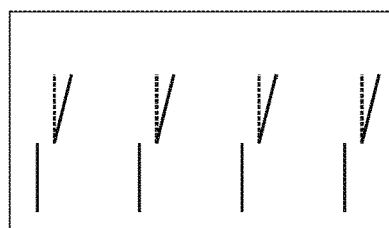

Consider now a case of a curve in the lanes because of shifts slowly growing along the length of the track moving from bottom to top in the figure. Slowly-growing shifts in phase are shown in FIG. 6E by "tilting" a new line by the amount of phase change that occurred between a past measurement and a next measurement. It is assumed that the track/lane continues to go in the same direction, rather than assuming that it stays in the same place. Applied to phase tracking, the phase value is chosen that corresponds to the smallest change in the phase derivative.

Figure 6F:
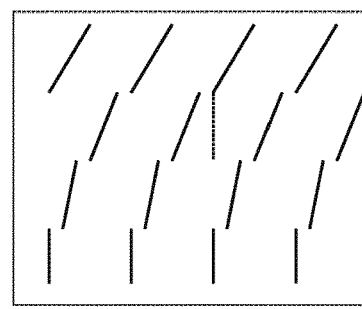
Figure 6G:
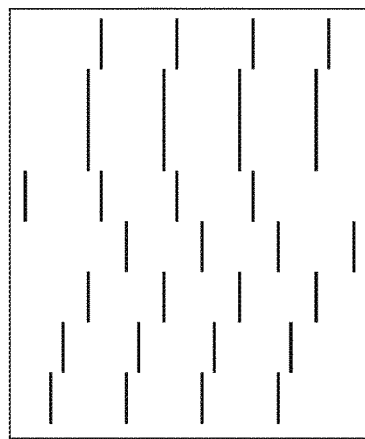

FIG. 6F applies this "tilting" rule (smallest change in the phase derivative) to the lanes in FIG. 6E which makes each lane unambiguous. This clarity remains even when the total shift between measurements is half of a lane as noted by the dotted line in the middle of FIG. 6F. Applying this rule for constructing curved lanes makes the ambiguous lanes shown in FIG. 6G much more easily identified as in FIG. 6H.

Returning to phase tracking strain in an optical fiber core in general and multiple core optical fibers in particular, inventor testing showed that a rate of change of the strain can often be constrained in example strain sensing applications to less than 6,000 ppm per millimeter.

If $\Lambda_E$ is the effective wavelength of the center of the laser sweep and D is the spatial resolution of the OFDR phase measurement (as well as the distance between gratings), then the laser scan range is selected to accommodate this spatial resolution taking into account the maximum rate-of-change of the strain, $$\left. \frac{d\varepsilon}{dz} \right|_{max}.$$

The spatial (sampling) resolution for OFDR measurements to prevent phase ambiguity is then determined using:

$$D < \sqrt{\frac{\Lambda_E}{\left.\frac{d\varepsilon}{dz}\right|_{max}}}$$

In a non-limiting example with 1550 nm light, $$\Lambda_E = \frac{\lambda}{2n} = \frac{0.00155 \text{ mm}}{2(1.48)} = 0.000524 \text{ mm}.$$

Using the example 6000 ppm/millimeter rate of change of strain restriction yields the following spatial resolution (corresponding to the spacing D between adjacent gratings along an optical fiber):

$$D < \sqrt{\frac{\Lambda}{\left.\frac{d\varepsilon}{dz}\right|_{max}}} = \sqrt{\frac{0.000524 \text{ mm}}{6000 \times 10^{-6} 1/\text{mm}}} = 0.295 \text{ mm or 295 microns}$$

This 295 micron value for D is more than an order of magnitude greater than the 26 micron value determined earlier for a strain range of 10,000 ppm. With this much larger value of D=295 microns, corresponding to a coarser spatial resolution (fewer phase measurement points per unit length along the fiber), the OFDR laser tuning range is much smaller than when D=26 microns. This lower resolution and smaller tuning range without phase measurement ambiguity is achieved by using the physical constraint on the maximum rate of change of the strain of 6000 ppm/millimeter. Even using an example conservative adjacent grating spacing D of 130 microns, a value between 26 microns and 295 microns, the OFDR laser tuning range is still much smaller than it would be for a 26 micron grating spacing calculated above for a (grating spacing value for a maximum strain range of 10,000 ppm). The OFDR measurement resolution where D=130 microns is considerably lower/coarser than D=26 microns. An example spatial sampling period is about half the spacing between adjacent gratings, which translates in this example where D=130 microns to an OFDR measurement resolution of 65 µm and a laser tuning range of about 12 nm (~1500 GHz@1550 nm).

In order to accommodate a strain range of +/−10,000 ppm, a laser tuning or scan range of +/−30 nm around 1550 nm (or a total range of 7500 GHz) would normally be required. However, restricting the rate of change of the strain to within +/−6,000 ppm/millimeter permits a considerably smaller laser tuning range to be used while still allowing measurement of an absolute strain of +/−10,000 ppm. A tuning range such as 12 nm in the numerical example above, where the adjacent grating spacing D is 130 microns, advantageously still allows for strain ranges larger than 10,000 ppm. Since the required tuning range is reduced by a factor of approximately two, (from 3900 GHz to 1500 GHz in the examples above), the rate at which OFDR phase measurement data can be acquired is effectively doubled because the laser scans for less time at a given scan rate/tuning range. This also significantly reduces the complexity and expense of the laser because the difficulty of making a laser goes up as the square of the tuning range. So in this example, the laser having a laser tuning range of 12 nm is about 6 times easier to make that a laser with a laser tuning range of 30 nm. Thus, the goal of effectively decoupling a strain range from laser tuning range is accomplished by constraining the maximum rate of change of strain. In addition, the strain measurements are still made with sufficient accuracy even at the lower/coarser OFDR spatial resolution, and as will now be explained further, without phase ambiguity.

Figure 7:
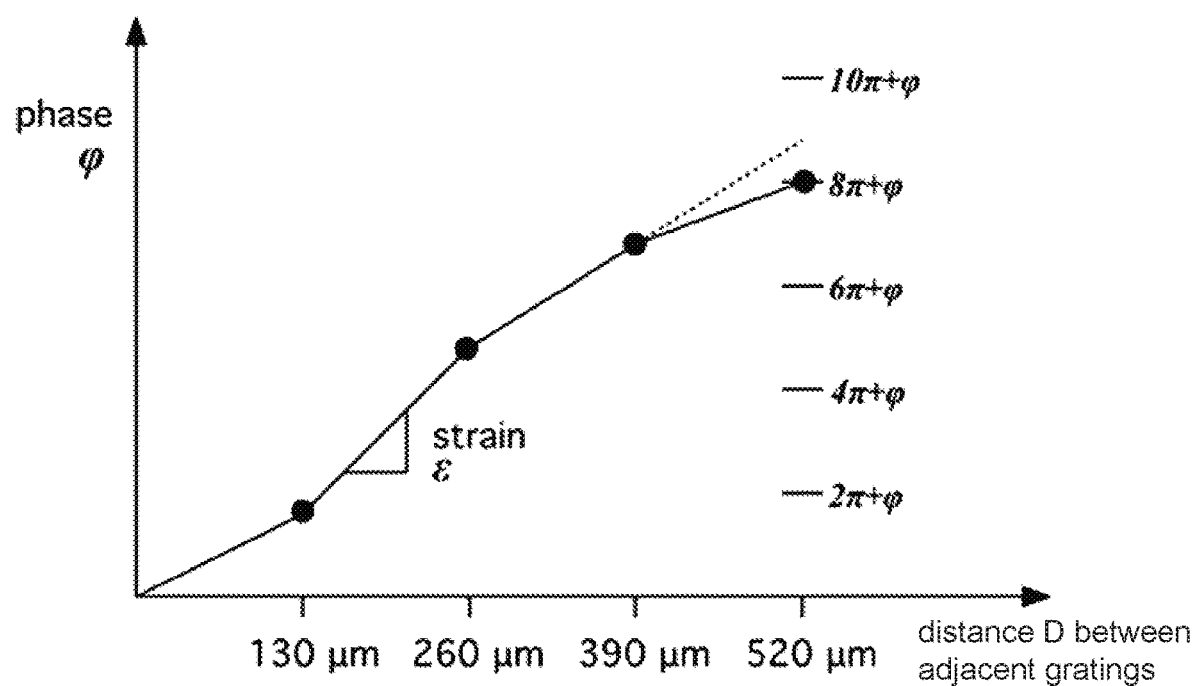
FIG. 7 is graph showing an example of relative phase of grating reflections versus distance along an optical fiber resulting in measurement ambiguity.

Returning to the problem of phase ambiguity typically associated with a smaller tuning range, FIG. 7 is graph showing an example of relative phase of grating reflections versus distance D between adjacent gratings along the optical fiber resulting in phase measurement ambiguity (this is analogous to the ambiguity mentioned above and illustrated conceptually in FIG. 6C). As the distance D between adjacent gratings increases and OFDR spatial resolution decreases, the relative phase ambiguity increases. If the phase ambiguity is not resolved, strain measurement accuracy can be compromised. Although phase ambiguity can be removed by spacing adjacent gratings more closely together, a disadvantage with this approach, as evident from the discussion above, is the laser then sweeps over a wider range of wavelengths/frequencies to resolve individual reflections making for a more complex and expensive laser, longer scan times, and more data processing.

FIG. 7 represents four microgratings spaced apart by 130 µm along the length of a fiber (the four grid lines along the horizontal axis), and each has a corresponding phase measurement (the four points in the graph). Five different phase values along the vertical axis are shown as five grid lines on the right side: 2 π+ϕ, 4 π+ϕ, 2 π+ϕ, 8 π+ϕ, and 10 π+ϕ. Each of these phase values corresponds to the same point in the complex plane. FIG. 7 shows that the rate of change of the phase ϕ as a function of distance z along the length of the fiber (the slope of the line connecting adjacent phase measurement points labeled below as k) corresponds to strain c. A constant strain c produces a constantly increasing phase ϕ:

$$\phi(z) = k\varepsilon z$$

But the phase ϕ can only be measured at discrete points along the fiber, spaced by Δz, (which corresponds to the grating spacing D), and complex reflectivity κ(z) is what is actually measured by the OFDR system:

$$\kappa(z) = \rho(z)e^{j\phi(z)}$$

$$\varphi_n = \arg(e^{ik\varepsilon n \Delta z})$$

Looking at the equation for a constant strain, the phase constantly increases until the phase "wraps" at 2 π radians (360 degrees). This is similar to a clock crossing from 12:59 to 1:00. Taking a derivative of the phase signal produces periodic "spikes" where the phase wraps at 27r radians (360 degrees). These spikes are non-physical and stem from the ambiguity caused by phase wrapping.

Figure 6H:
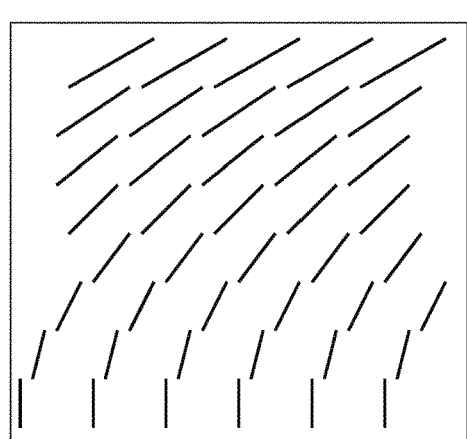

The dotted line in FIG. 7 is the projection of the phase curve if the previous strain (the slope of the line between the two adjacent graph points associated with 260 µm and 390 µm) was maintained, which corresponds conceptually to the tilted lanes of FIGS. 6F and 6H. The phase point closest to this strain projection minimizes the rate of change of the phase, which in the example of FIG. 7 is 8 π+ϕ. Choosing the phase point 8 π+ϕ closest to this strain projection corresponds to a constraint on the rate-of-change of the strain, which is an important constraint as explained above.

So choosing the phase measurement point closest to the strain projection resolves phase ambiguities and decouples the spatial resolution of an OFDR measurement system where a higher strain range is achieved with a shorter tuning range of the laser. In one example implementation, phase unwrapping may be performed to reduce or minimize the phase derivative by choosing the value of the current phase point to be the closest value to the last phase point. But in another example implementation, phase unwrapping is performed to reduce or minimize the second derivative of the phase. To do this, the previous two phase measurement points are used. If a current phase measurement point is point i, and the two previous phase measurement points are points i-1 and i-2, a "projected" phase measurement point may be calculated by assuming the rate of change present from point i-2 to point i-1 continued to point i:

$$\phi_{projected,i} = \text{previousPhase} + \text{previousPhaseChange} = \phi_{i-1} + (\phi_{i-1} - \phi_{i-2}) = 2\phi_{i-1} - \phi_{i-2}$$

This is illustrated in FIG. 7 with the points i-1 and i-2 corresponding to distances 390 microns and 260 microns, respectively, and point i corresponding to distance 520 microns. The phase projection is the dotted line extending from the phase point i-1 at 390 microns. The branch (p) of the current phase, $\phi_i + 2\pi p$, is then selected so that the difference $\Delta$ from the projected phase is minimized:

$$|\phi_{projected,i} - \phi_i - 2\pi p| = \Delta$$

Now we return to the problem of gratings being strained outside of the tuning range, which renders the reflections unmeasurable. Long, uniform gratings reflect narrow bands of light, and once these gratings experience sufficiently large strain such that this reflection band is outside of the laser scan range, these gratings are no longer useful for strain sensing. However, very short gratings, referred to here as microgratings, reflect broad bands of light and can be designed so that the reflected wavelength is within the tuning range, even when large strain is applied. Microgratings provide good spatial resolution and accurate measurement of wavelength shifts that are larger than half of tuning range of the laser.

Figure 8A:
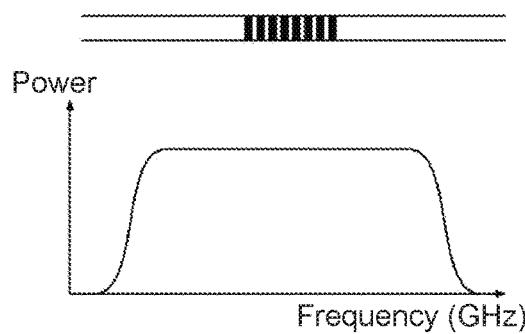
FIGS. 8A and 8B illustrate a relationship between grating length and spectral width.
Figure 8B:
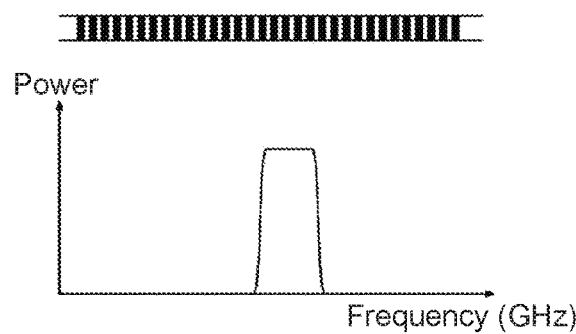

The bandwidth of a Bragg grating reflection is inversely proportional to its length. The length of the grating and the width of its reflective peak are related by a Fourier transform. FIGS. 8A and 8B illustrate this relationship between grating length and spectral width showing a narrower grating on the left having an associated wider reflection peak and a wider grating on the right having an associated narrower reflection peak.

Figure 8C:
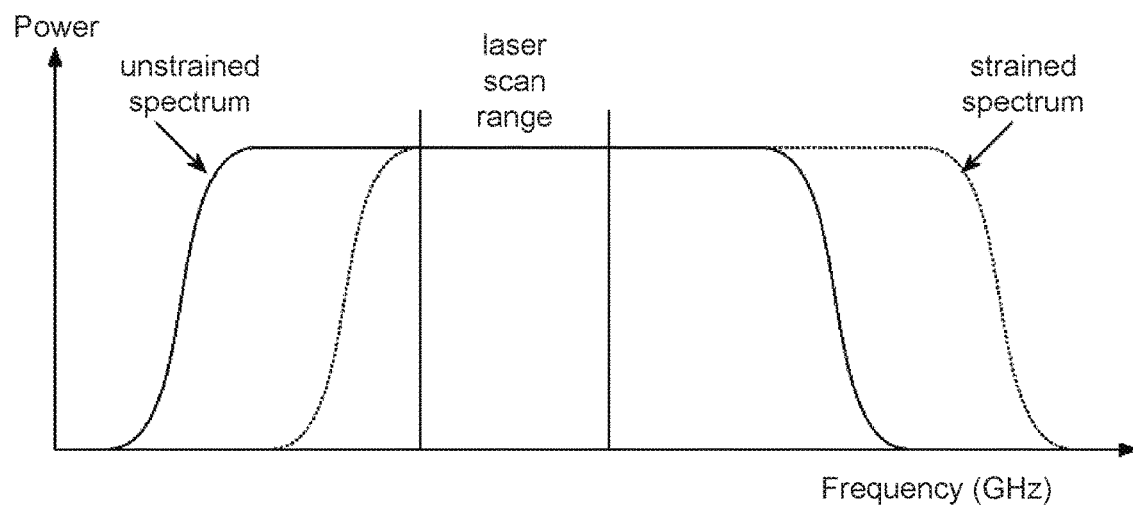
FIG. 8C shows how a wider spectral width permits measurement of reflected power in a laser scan range for large strains.

Gratings with a wider reflection peak allow for a greater strain range within a given measurement tuning range. FIG. 8C shows how a greater spectral width permits measurement of reflected power in a laser scan range for larger strains.

In an example case of a 10,000 ppm microstrain range, large portions of a grating reflection are preferably still within the laser scan range even when shifting the reflection center wavelength by 15 nm or more. For many applications, a grating width may be about four times the maximum reflection center wavelength shift. In an example of a wavelength shift of 15 nm times 4, the grating width is 60 nm. If the laser wavelength center is 1550 nm, then the grating's spectral width is roughly about 7500 GHz. Taking the inverse of 7500 GHz gives 133 femtoseconds, and converting this to a total "roundtrip" (from start of the grating to the end of the grating and back) distance in the optical fiber gives a grating length of 13.5 microns which is on the order of 10 microns. Gratings on the order of 10 microns in length provide a reflection bandwidth broad enough to sense maximum strain magnitudes up to 10,000 ppm. Thus, gratings with length on the order of tens of microns (microgratings) are advantageous for many applications.

One non-limiting example embodiment of an optical fiber with microgratings includes a series of 10 μm long gratings with adjacent microgratings spaced 130 μm apart.

Another non-limiting example embodiment of an optical fiber with gratings includes one or more microgratings located at one or more portions of the optical fiber expected to experience larger strains, e.g., at a distal portion of the optical fiber. The optical fiber further includes one or more wider gratings located at one or more other portions of the optical fiber expected to experience smaller strains, e.g., at a proximate portion of the optical fiber.

Optical fiber systems may be used over a wide range of wavelengths, and different wavelengths have different advantages and drawbacks. Shorter, visible wavelengths (e.g., around 500 nm) typically provide better resolution because a given change in length will be a larger percentage of the wavelength. For example, at 500 nm (blue light), a distance change of 160 nm causes a 360 degree change in phase instead of the 120 degree change in phase that would occur for light in the 1550 nm band. Around 500 nm, a 10,000 microstrain causes a shift of 6000 GHz. So, in order to capture this strain range up to 10,000 microstrain, the laser needs a tuning range of 12,000 GHz. A laser that could tune over 12,000 GHz (a 20 nm range) at this wavelength is extremely difficult to build.

However, applying the rate of strain change restriction described above, and incorporating a new wavelength in the fiber core, results in a spacing between gratings of:

$$D < \sqrt{\frac{\Lambda}{\left|\frac{d\varepsilon}{dz}\right|_{max}}} = \sqrt{\frac{0.000166 \text{ mm}}{6000 \times 10^{-6} 1/\text{mm}}} = 0.167 \text{ mm}$$

Adding the same margin as was done in the previous example above, produces a spatial resolution of 0.083 mm. In order to achieve this spatial resolution, the laser needs to tune or scan 1200 GHz, which is 5 times less than would otherwise be required. In the case of a 500 nm visible blue laser, this is only 2 nm of tuning range for sensing tension and compression in the fiber core.

Accordingly, microgratings may be used with lasers operating around many different wavelengths, with 500 nm and 1550 nm being two non-limiting examples of such different wavelengths.

Microgratings are difficult to inscribe onto a fiber core, and even more difficult to inscribe on multiple cores in a multicore fiber sensor. Some reasons why inscribing microgratings onto one or more cores of an optical fiber is difficult do in a manufacturing context are now described.

Discrete broadband reflections are created by an infinitely short step in the index of refraction that effectively functions as a mirror reflecting light at all wavelengths. If a reflector reflects at all wavelengths, then it reflects optical power within the scan range of the swept laser for all strains. Creating such ideal reflections at regularly-spaced intervals, thousands of times in a single fiber is technically challenging. Very short Bragg gratings are used in this application to create reflections approximating these ideal reflections, and are referred to as microgratings because the length of each micrograting is on the order of tens of micrometers.

Creating an infinitely short step in the index of refraction to create a perfect reflection over all wavelengths is technically not feasible. However, we could create a very narrow, say 10 μm long change in the index of refraction, as illustrated in FIG. 8A. Such a feature would have a broad reflection spectrum, however the spectrum would be centered about DC, or well outside of our laser tuning range. In order to create a broadband reflection with a reflected frequency centered in our tuning range, the index of refraction change must be modulated at a frequency that shifts the center wavelength to the desired band. In other words, we create a micrograting.

Figure 9A:
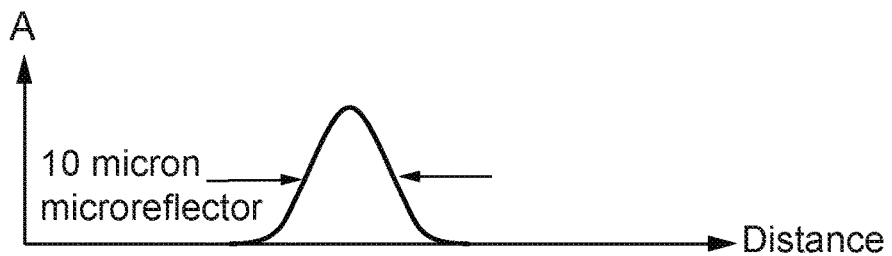
FIGS. 9A-9D are graphs that illustrate the effect of modulation on the grating reflection spectrum of an index modulation.
Figure 9B:
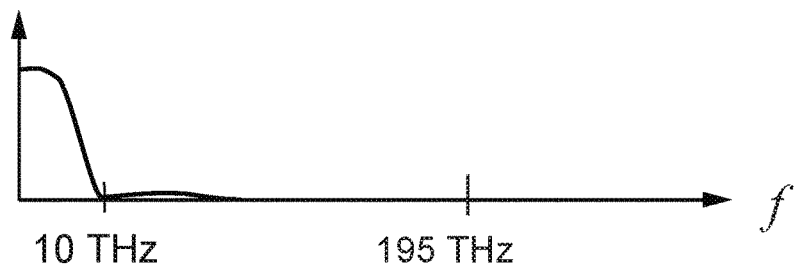
Figure 9C:
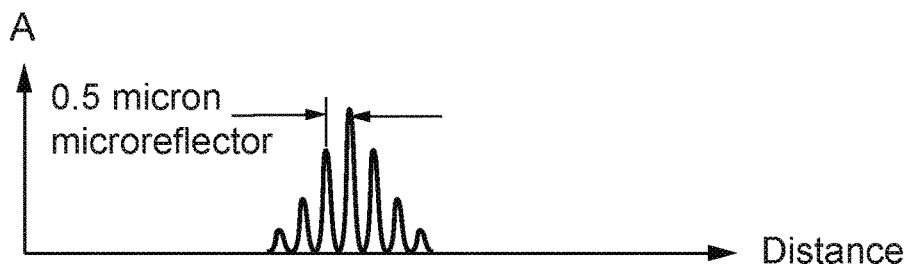
Figure 9D:
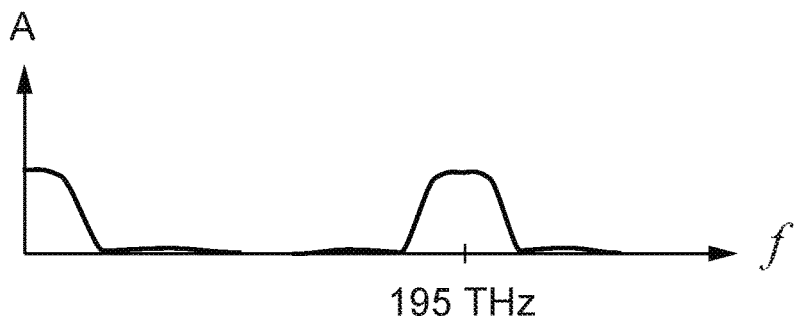

FIGS. 9A-9D are graphs that illustrate the effect of modulation on the reflection spectrum of a micrograting. FIG. 9A shows an index perturbation that is 10 μm long. The spectrum of the grating illustrated in 9A is shown in 9B. This spectrum shows that the simple perturbation will be a poor reflector (essentially no reflection) in the frequency range of the swept laser, which in this example is centered at 195 THz. However, by modulating the index of refraction perturbation, as shown in FIG. 9C, with a period equal to the effective wavelength at the center of the laser scan, the amount of light reflected by such a grating in the laser wavelength range centered at 195 THz is significantly increased as shown in the spectrum illustrated in FIG. 9D.

To inscribe microgratings onto a core, an ultraviolet UV beam having a very specific interference pattern corresponding, in this non-limiting example, to a 10 μm long grating having individual index of refraction perturbations with a period of ΛG. ΛG is chosen to be the effective wavelength of the light at the center of the laser scan. So if the laser sweeps from 1530 nm to 1550 nm, the center vacuum wavelength is 1540 nm, and the effective wavelength is 524 nm.

These microgratings form the reflectors (e.g., G1, G2, etc. shown in FIG. 5). With gratings that are 10 microns long, and the period of the perturbations in the index of refraction about 524 nm in this example, the perturbation within each grating is about 20 periods. Scanning over 12 nm, the length of the gratings is significantly smaller than the resolution of an example OFDR measurement. As a result, each gratings appears as a point reflection at which phase is sampled, as described above.

Illuminating all of the fiber cores with the intensity profile in FIG. 9A is not difficult because at UV wavelengths, a 10 micron diameter beam remains collimated for a significant distance. Although the modulated pattern in FIG. 9C can be used to produce microgratings with stronger reflections over the laser scanning/tuning range, as this modulated pattern with high spatial frequency content (the "fringes") propagates, a significant amount of diffraction occurs as shown in the example in FIG. 12 (described further below). The problem is that even though the grating pattern in FIG. 9A can be easily made, that pattern is not desired, and the more desired grating pattern, like the example shown in FIG. 9C, is not easily made.

FIG. 10 is a graph that illustrates the index modulation for an example desired UV interference pattern to inscribe in the core(s) to form microgratings in an example optical fiber sensor. Each 10 μm long micrograting spaced from an adjacent micrograting by 130 μm has a modulated index change as shown. The index modulation is a periodic pattern with a period equal to the effective wavelength of the center wavelength of the laser sweep.

Figure 11:
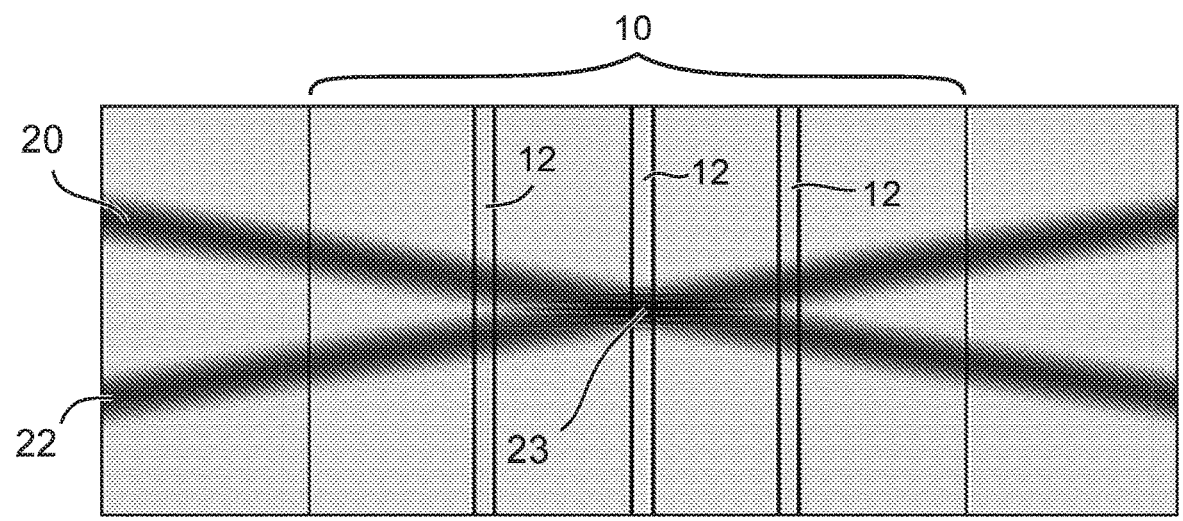
FIG. 11 is a diagram illustrating an interference pattern generated by two crossing UV beams having the same width.

A problem is that a modulated UV beam cannot be effectively propagated because of diffraction. This problem is illustrated in FIG. 11 by considering two narrow UV beams 20 and 22 having the same width that cross at the angle required to produce the 500 nm interference patterns (fringes) for inscribing the desired microgratings onto the fiber cores. These beams 20 and 22 only remain overlapped for about 20 microns as indicated generally at 23. So while this overlap might be sufficient to inscribe microgratings for one core 12 with only a 5 micron diameter, it is generally insufficient to inscribe microgratings for multiple cores 12 in a multicore fiber like that shown in FIG. 1. To inscribe such a multicore fiber, the beams in this example should overlap by about 70-500 microns.

Figure 12:
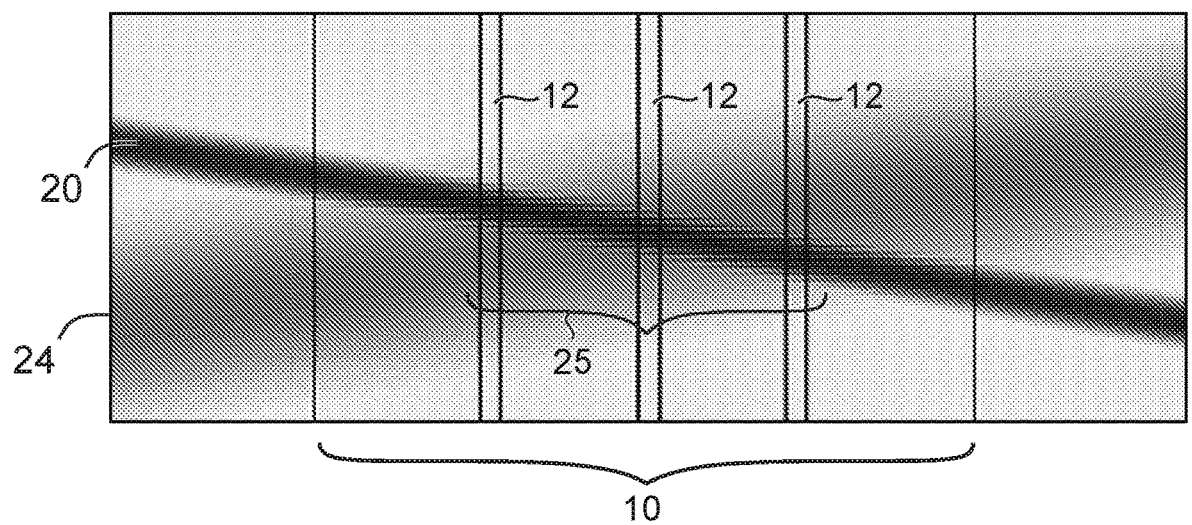
FIG. 12 is a diagram illustrating an interference pattern generated by two crossing UV beams, one beam having a smaller width (narrow beam) and one beam having a larger width (wide beam)

Instead of using two narrow beams, the inventors concluded that crossing a wider UV beam 24 with a narrower UV beam 20 generates an interference pattern that is much wider. In one example test that confirmed this result, a collimated UV beam about 250 microns in diameter (an example implementation of the wide beam 24) was crossed with a narrower UV beam about 10 microns in diameter (an example implementation of the narrow beam 20). As shown in FIG. 12, the interference pattern generated (indicated at 25) by crossing the wider and narrower UV beams 24 and 20 is a much wider and in this example overlaps all the cores 12 in the fiber 10, and therefore, this interference pattern 25 can be used to inscribe the desired microgratings on all the cores 12 of a multicore fiber at the same time.

Figure 13:
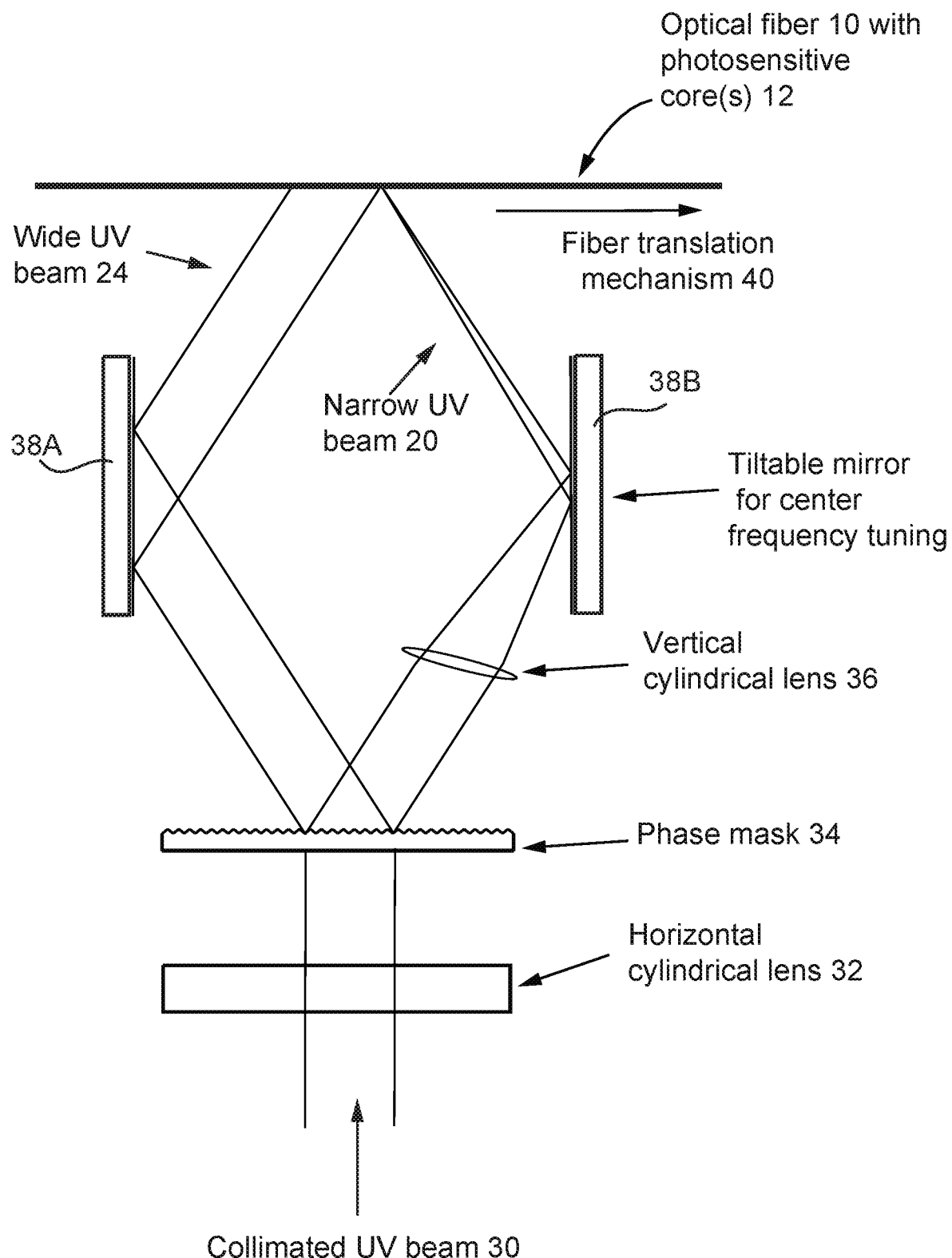
FIG. 13 is a diagram of an example optical apparatus for inscribing microgratings onto an optical fiber to generate small grating interference patterns on multiple cores.

FIG. 13 is a diagram of an example optical apparatus for writing microgratings onto an optical fiber to generate small grating interference patterns. A collimated UV beam 30 is directed through a horizontal cylindrical lens 32 which focuses the light into a line on the fiber, and then is passed on through a phase mask 34 which splits the light into two beams. A vertical cylindrical lens 36 focuses the masked light into a narrower beam that is reflected by a tiltable mirror 38B, which is used for center frequency tuning, toward the optical fiber 10. The masked light is also reflected by another tiltable mirror 38A which directs a wide UV beam 24 toward the optical fiber 10. The wide UV beam 24 and the narrow UV beam 20 cross to form the interference pattern that inscribes the desired micrograting on each of the photosensitive cores 12 in the fiber 10. At each translation of the fiber, the interference pattern inscribes another micrograting onto the cores at that location.

Figure 14:
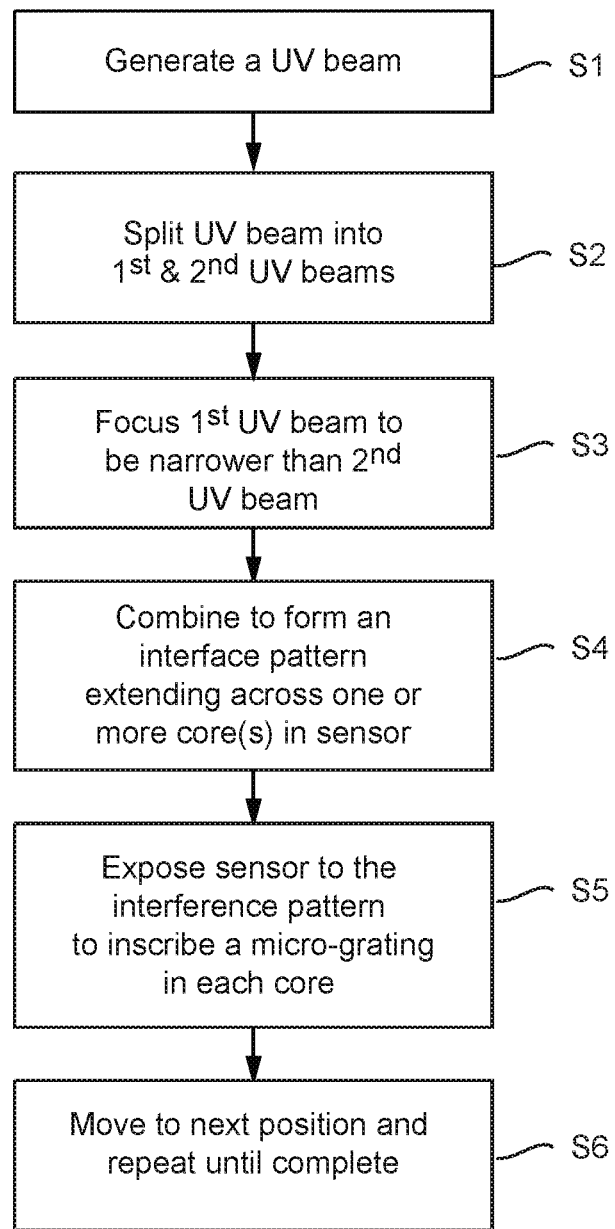
FIG. 14 is flowchart diagram illustrating example steps for inscribing microgratings onto an optical fiber to generate small grating interference patterns on multiple cores.

FIG. 14 is flowchart diagram illustrating example steps for inscribing microgratings onto an optical fiber to generate small grating interference patterns on multiple cores. First, an ultraviolet light beam is generated in step S1, and then the ultraviolet light beam is split into a first ultraviolet light beam and a second ultraviolet light beam in step S2. The first ultraviolet light beam is focused in step S3 so the first ultraviolet light beam is narrower in width than the second ultraviolet light beam. The first narrower ultraviolet light beam and the second ultraviolet light beam are combined, e.g., crossed, to form an interference pattern that extends across all of the cores in the multi-core optical fiber sensor in step S4. The multi-core optical fiber sensor is exposed to the interference pattern to inscribe a grating in each of the cores in step S5. The optical fiber is moved to a next position, and steps S1-S5 are repeated. Steps S1-S6 are repeated until the desired number of microgratings are inscribed in the optical fiber. This method allows microgratings to be written using a single pulse into multiple cores, in one example, which is efficient and effective. Alternatively, microgratings may be inscribed using multiple pulses or using a continuous wave (CW) unpulsed laser. Any multi-core fiber can be made using this method, including but not limited to shape sensing fibers.

Referring again to FIG. 5, the four gratings on the single core 12 shown are microgratings with the following example ranges: W (length of one micrograting along the length of the fiber) is in the range of 10 μm to 100 μm, with a preferred but still example range of 10 μm to 50 μm, and $\Lambda_G$ (spacing between individual reflectors i.e., individual refractive index perturbations, in a single Bragg grating) is in the range of 100 nm to 2000 nm.

In other words, the grating length W is made shorter than the resolution of the OFDR system being used. Once a multicore fiber optical sensor is made that includes microgratings inscribed on the cores at multiple locations along the length of the sensor, the sensor can be used with a tunable laser that generates light over a range of wavelengths corresponding to a tuning range of the tunable laser. Each grating includes at least two refractive index perturbations spaced apart along the length of the core by a spacing distance that is based on the center wavelength of the tunable laser. A width of a spectrum of a reflection from the grating encompasses a predetermined range of strains to be measured by the optical sensor including a maximum strain to be measured that creates a wavelength shift greater than half of the tuning range of the tunable laser. A portion of the spectrum of the grating reflection is within the tuning range of the tunable laser for the predetermined range of strains.

Referring again to FIG. 5, in an example fiber-with-microgratings implementation, the distance D between adjacent microgratings is in the range of 50 μm to 0.5 mm. The distance D may be the same between pairs of adjacent microgratings, or distance D may vary for different pairs of adjacent microgratings.

Example embodiments include an optical sensing system that uses an optical sensor with microgratings. A tunable laser generates light over a range of wavelengths corresponding to a tuning range of the tunable laser. The optical sensor includes an optical fiber including one or more cores. Each core is inscribed with a grating at multiple locations along a length of the core. Each grating includes at least two refractive index perturbations spaced apart along the length of the core by a spacing distance that is associated with the tuning range of the tunable laser. A width of a spectrum of a reflection from the grating encompasses a predetermined range of strains to be measured by the optical sensor including a maximum strain to be measured that creates a wavelength shift greater than half of the tuning range of the tunable laser. A portion of the spectrum of the grating reflection is within the tuning range of the tunable laser for the predetermined range of strains. Circuitry, such as OFDR circuitry, detects measured reflection data from the optical fiber over the tuning range of the tunable laser, and determines a strain on the optical fiber based on the determined change in the detected measurement reflection data.

Figure 15:
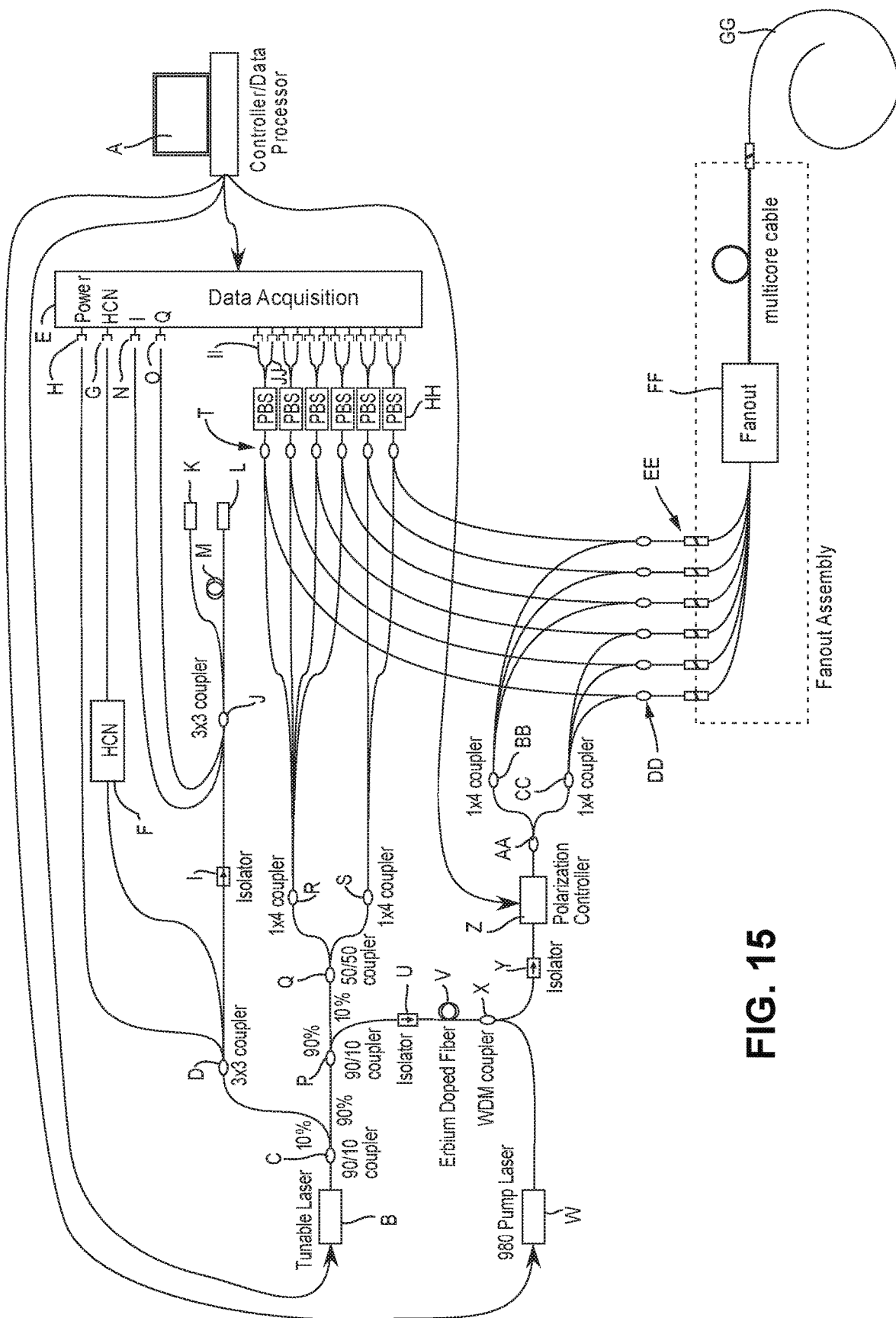
FIG. 15 is a diagram of an example OFDR system that measures strain on an optical fiber sensor with microgratings.

FIG. 15 is a diagram of an example OFDR system that measures strain on a multicore optical fiber sensor with microgratings inscribed on each of the cores. Other implementations and/or components may be used. Moreover, not every component shown is necessary. The system controller and data processor (A) initiates two consecutive sweeps of a tunable laser (B) over a defined wavelength range and tuning rate. Light emitted from the tunable laser is split at coupler (C). 10% of the light goes into a network used to monitor the laser tuning. In this network, light is split via an optical coupler (D) and sent to a power detector (H) to monitor the laser power and through a gas (e.g., Hydrogen Cyanide) cell reference (F) used for C-Band wavelength calibration. The gas cell spectrum is acquired by a photodiode detector (G) linked to a Data Acquisition Network (E).

The remaining portion of light split at optical coupler (D) is routed through an isolator (I) to an interferometer constructed from an optical coupler (J) attached to two Faraday Rotator Mirrors (K, L). The first Faraday Rotator Mirror (FRMs) (K) serves as the reference arm of the interferometer while the second Faraday Rotator Mirror (L) is distanced by a delay spool (M) of optical fiber. This interferometer produces a monitor signal that is used to correct for laser tuning nonlinearity and is acquired by the Data Acquisition Network (E) via photodiode detectors (N, O).

Light is also routed to an interrogator network by optical coupler (C). This light is split at another coupler (P) to reference and measurement arms of this network. About 90% of the light is routed to the reference arm, where it is split with cascaded couplers (Q, R, S) to form 6 reference paths. The reference light is recombined with the measurement light at 6 couplers (T), one for each measurement channel.

About 10% of the light is split at coupler P to the measurement branch of the interrogator network. This light first passes through an isolator (U) and then through a length of erbium doped fiber (V). The erbium doped fiber (V) is pumped with light from the 980 pump laser (W) which enters via a WDM coupler (X). When pumped with light from the 980 pump laser, the erbium doped fiber (V) serves as an amplifier, increasing the power of the light in the measurement branch. This amplified light then passes through another isolator (Y) and a polarization controller (Z) that rotates the laser light to an orthogonal state between the two successive laser scans. This light is then split via a series of optical couplers (AA, BB, CC) evenly between six channels. The light on each of these fiber channels light passes through a coupler (DD) a connector (EE) to one of the fibers in a fanout (FF) that connects to the sensing fiber (GG). The sensing fiber (GG) contains a central optical core concentric to six helically-wound outer optical cores in this non-limiting example. The center core and five outer cores are measured.

The resulting reflections from the microgratings in the sensing fiber (GG), after a laser scan, pass back through the connectors (EE) and couplers (DD) and interfere with the reference path light of the interrogator network when recombined at optical couplers (T). The resulting interference pattern passes through an optical polarization beam splitter (HH) separating the interference pattern into the two principle polarization states ($S_1$, $P_1$). Each of the two polarization states is acquired by the data acquisition network (E) using two photodiode detectors (II, JJ). The system controller and data processor (A) interprets the signals of the six individual optical cores and produces a measurement of both position and orientation along the length of the shape sensing fiber (GG). Data is then exported from the system controller (A) for display and/or other use.

More specifically, in example embodiments, the system controller and data processor (A) linearizes the measurement data with respect to optical frequency using the data from the laser monitor interferometer so that it is represented in equal increments of optical frequency. The linearized data is Fourier transformed into the time domain to represent the amplitude and phase of the reflected light as a function of optical delay along each core. A useful property of an OFDR measurement is related to a property of a Fourier transform. Each measurement "point" in the temporal domain represents the entire frequency response of that location as a tunable laser is swept through a range of frequencies. The S and P data from two sequential orthogonal polarization scans are combined to compensate for birefringence in the fiber cores and form a scalar measure of the amplitude and phase of the reflected light from each core. This combined complex signal (amplitude and phase) is compared with baseline interferometric data recorded in a reference scan or an extended reference scan with the sensing fiber is in an unstrained or otherwise reference state, and the resulting phase difference/change for each core is the measurement data used to compute one or more sensing parameters like strain, temperature, shape, location, etc. In more detail, the derivatives of the measured phase changes are proportional to the strains in each core. The proportionality constant, $\gamma_i$, relating the phase to strain in core i is the strain-optic coefficient for that core. Consider $$\begin{bmatrix} \varphi'_1(z) \\ \varphi'_2(z) \\ \varphi'_3(z) \\ \varphi'_4(z) \end{bmatrix} = \begin{bmatrix} \alpha\gamma_1 r_1 \sin(\theta_1) & -\alpha\gamma_1 r_1 \cos(\theta_1) & \beta\gamma_1 r_1^2 & \gamma_1 \\ \alpha\gamma_2 r_2 \sin(\theta_2) & -\alpha\gamma_2 r_2 \cos(\theta_2) & \beta\gamma_2 r_2^2 & \gamma_2 \\ \alpha\gamma_3 r_3 \sin(\theta_3) & -\alpha\gamma_3 r_3 \cos(\theta_3) & \beta\gamma_3 r_3^2 & \gamma_3 \\ \alpha\gamma_4 r_4 \sin(\theta_4) & -\alpha\gamma_4 r_4 \cos(\theta_4) & \beta\gamma_4 r_4^2 & \gamma_4 \end{bmatrix} \begin{bmatrix} B_x(z) \\ B_y(z) \\ T(z) \\ E(z) \end{bmatrix} \quad (2)$$

where $\varphi'_i(z)$ is the derivative of the measured phase change for core i as a function of distance along the fiber sensor.

The shape of the fiber is constrained by the dimensions of the fiber and the forces that deform the fiber. In many cases, the rate-of-change of the bend B of the fiber, $$\frac{dB}{dz},$$

is limited by its application and environment, and consequently, smaller scanning/tuning ranges of the laser may be used if the microgratings are used as described above.

Figure 16:
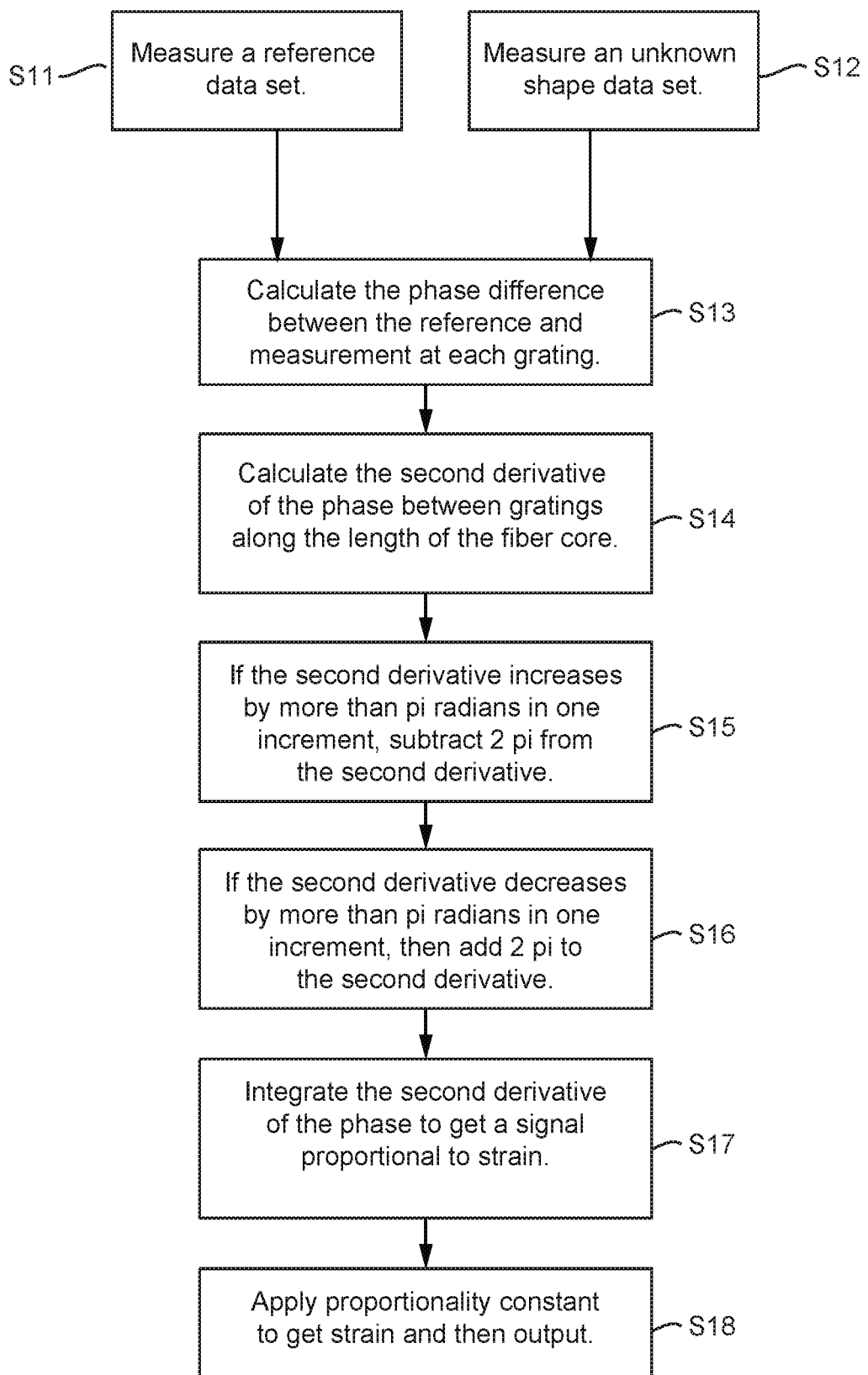
FIG. 16 is a flowchart illustrating example procedures for measuring strain on an optical fiber sensor with microgratings inscribed on each of the cores.

FIG. 16 is a flowchart illustrating example procedures for measuring strain on a multicore optical fiber sensor with microgratings inscribed on each of the cores. In step S12, a reference OFDR data set is measured for the multicore optical fiber with microgratings. In step S11, the same optical fiber is measured in an unknown shape or other condition to generate a measurement OFDR data set. The phase difference between the reference data set and the measurement data set is calculated at step S13. The second derivative of the phase difference between the reference and measurement data sets for each fiber core is calculated in step S14. If the second derivative increases by more than π radians in one increment, 2 π is subtracted from the second derivative in step S15. If the second derivative decreases by more than 7C radians in one increment, then 2 π is added to the second derivative in step S16. The second derivative is then integrated to get a signal proportional to strain in step S17. A proportionality constant is then applied to the integral result to get strain which is then output in step S18.

The technology in this application decouples strain range from laser tuning range and describes an optical fiber sensor with microgratings that allows significantly smaller laser scanning/tuning ranges than would otherwise be required. OFDR systems need not be over-specified with respect to the tuning range of the laser, and therefore, can permit the use of less complex and expensive lasers, reduce laser scan times and the amount of OFDR data to process, and still achieve high OFDR measurement resolution and therefore high measurement accuracy. Phase ambiguity normally associated with smaller laser scanning ranges is avoided using a phase unwrapping procedure as described above. Microgratings may be written into single core or multicore fiber using an optical apparatus that creates UV grating patterns over large areas as described above.

Microgratings allow for the acquisition of data over a narrower range of wavelengths for a given strain range if the rate-of-change with respect to length along the fiber of the strain is constrained. This narrower scan range means that less data is acquired and processed. This narrower scan range means that the data can be acquired more quickly. This narrower scan range means that the laser can be manufactured more easily with looser tolerances.

Figure 17:
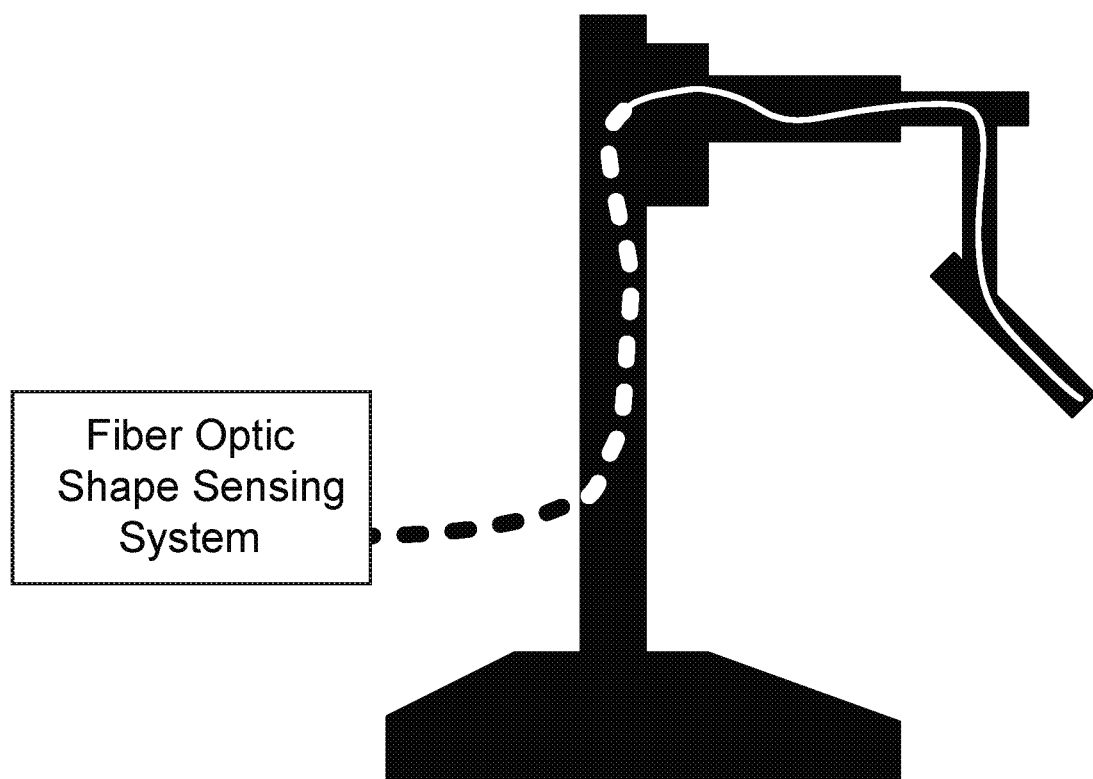
FIG. 17 is a diagram of an example fiber optic shape sensing system using an optical fiber sensor with microgratings to sense a position or configuration of a robotic arm.

The technology described above has wide and diverse applications. One non-limiting example application for shape sensing fiber that uses a high degree of confidence in terms of the accuracy and reliability of the shape sensing output is robotic arms used in surgical or other environments. See FIG. 17. The technology described above is particularly helpful in this and other optical fiber sensor applications.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC § 112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. An optical sensor comprising:
    an optical fiber including multiple cores;
    first microgratings inscribed in the multiple cores at a common first location along a length of the optical fiber; and
    second microgratings inscribed in the multiple cores at a common second location along the length of the optical fiber;
    wherein each of the first and second microgratings has a grating length of no more than 50 μm.

2. The optical sensor of claim 1, wherein the grating length of each of the first and second microgratings is in a range from 10 μm to 50 μm.

3. The optical sensor of claim 1, wherein the grating length of each of the first and second microgratings is less than a maximum spacing between the multiple cores, the maximum spacing measured in a cross section of the optical fiber.

4. The optical sensor of claim 3, wherein the maximum spacing between the multiple cores is in a range from 70 μm to 500 μm.

5. The optical sensor of claim 1, wherein the first microgratings and the second microgratings are adjacent microgratings along the length of the optical fiber, and wherein the first and second common locations are spaced at least 130 μm apart.

6. The optical sensor of claim 5, wherein the first and second common locations are spaced at least 200 μm apart.

7. The optical sensor of claim 1, wherein each of the first and second microgratings comprises periodic refractive index perturbations having a period in a range from 100 nm to 2000 nm.

8. The optical sensor of claim 1, wherein the first and second common locations are in a distal portion of the optical fiber, wherein the optical sensor further comprises additional gratings inscribed in the multiple cores, and wherein the additional gratings have longer grating lengths than the first and second microgratings.

9. The optical sensor of claim 1, wherein:
the optical sensor is configured for use with a tunable laser having an associated tuning range, the tuning range having an associated spatial resolution of sensor measurements;
each of the first and second microgratings has a reflection spectrum sufficiently wide to enable strain measurements up to a strain that causes a center wavelength shift of the reflection spectrum by more than half of the tuning range of the tunable laser; and
the first microgratings and the second microgratings are adjacent microgratings along the length of the optical fiber, and the first and second common locations are spaced apart farther than the spatial resolution of sensor measurements.

10. The optical sensor of claim 9, wherein the tuning range is no more than 12 nm and the optical sensor is capable of strain measurements up to 10,000 ppm without phase ambiguity at rates of change of the strain within 6000 ppm/millimeter.

11. A method of manufacturing an optical sensor, the method comprising:
providing an optical fiber including multiple cores;
inscribing first microgratings in the multiple cores at a common first location along a length of the optical fiber; and
inscribing second microgratings in the multiple cores at a common second location along the length of the optical fiber;
wherein each of the first and second microgratings has a grating length of no more than 50 μm.

12. The method of claim 11, wherein the grating length of each of the first and second microgratings is in a range from 10 μm to 50 μm.

13. The method of claim 11, wherein the grating length of each of the first and second microgratings is less than a maximum spacing between the multiple cores, the maximum spacing measured in a cross section of the optical fiber.

14. The method of claim 13, wherein the maximum spacing between the multiple cores is in a range from 70 μm to 500 μm.

15. The method of claim 11, wherein the first microgratings and the second microgratings are adjacent microgratings along the length of the optical fiber, and wherein the first and second common locations are spaced at least 130 μm apart.

16. The method of claim 15, wherein the first and second common locations are spaced at least 200 μm apart.

17. The method of claim 11, wherein each of the first and second microgratings comprises periodic refractive index perturbations having a period in a range from 100 nm to 2000 nm.

18. The method of claim 11, wherein the first and second common locations are inscribed in a distal portion of the optical fiber, the method further comprising:
inscribing additional gratings in the multiple cores, wherein the additional gratings have longer grating lengths than the first and second microgratings.

19. The method of claim 11, wherein:
the optical sensor is configured for use with a tunable laser having an associated tuning range, the tuning range having an associated spatial resolution of sensor measurements;
each of the first and second microgratings has a reflection spectrum sufficiently wide to enable strain measurements up to a strain that causes a center wavelength shift of the reflection spectrum by more than half of the tuning range of the tunable laser; and
the first microgratings and the second microgratings are adjacent microgratings along the length of the optical fiber, and the first and second common locations are spaced apart farther than the spatial resolution of the sensor measurements.

20. The method of claim 19, wherein the tuning range is no more than 12 nm and the optical sensor is capable of strain measurements up to 10,000 ppm without phase ambiguity at rates of change of the strain within 6000 ppm/millimeter.

* * * * *